| (12) United States Patent | (10) Patent No.: US 8,086,179 B2 |
| Song | (45) Date of Patent: Dec. 27, 2011 |

(54) MOBILITY MANAGEMENT OF MULTIPLE CLUSTERS WITHIN A WIRELESS COMMUNICATIONS NETWORK

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 12/212,331

(22) Filed: Sep. 17, 2008

(65) Prior Publication Data

US 2009/0082025 A1    Mar. 26, 2009

Related U.S. Application Data

(60) Provisional application No. 60/974,808, filed on Sep. 24, 2007, provisional application No. 60/974,800, filed on Sep. 24, 2007, provisional application No. 60/974,814, filed on Sep. 24, 2007.

(51) Int. Cl.
*H04B 1/00* (2006.01)

(52) U.S. Cl. ....... 455/63.1; 455/443; 455/450; 455/451; 455/452.1; 455/452.2; 455/453; 455/422.1; 455/424; 455/446.1; 455/67.13; 370/310.2; 370/312; 370/328; 370/329; 370/431; 370/254

(58) Field of Classification Search .................. 455/443, 455/446, 422.1, 424, 453, 500, 501, 509, 455/518, 519, 63.1, 67.13, 69, 450, 451, 455/452.1, 452.2; 370/310.2, 312, 328, 329, 370/330, 331, 332, 334, 431, 432, 254, 537, 370/538

See application file for complete search history.

(56) References Cited

U.S. PATENT DOCUMENTS

| 7,035,657 | B2 | 4/2006 | Chen et al. |
| 7,158,502 | B2 | 1/2007 | Harris et al. |
| 7,260,396 | B2 * | 8/2007 | Balachandran et al. ... 455/435.1 |
| 7,283,815 | B2 | 10/2007 | Kim et al. |
| 7,315,523 | B2 | 1/2008 | Cai et al. |

(Continued)

FOREIGN PATENT DOCUMENTS

EP    1503609 A2    2/2005

(Continued)

OTHER PUBLICATIONS

International Preliminary Report on Patentability, PCT/US2008/076978, International Bureau, The International Bureau of WIPO, Apr. 1, 2010.

(Continued)

*Primary Examiner* — Olumide T Ajibade Akonai
(74) *Attorney, Agent, or Firm* — Raphael Freiwirth

(57) ABSTRACT

Aspects of mobility management within a wireless communications network including a plurality of sectors are disclosed. In an example, the wireless communications network includes a first cluster of sectors with at least one target sector and at least one supporting sector. The multicast communication session is carried within both the target and supporting sectors. In another example, a second cluster can be included within the network for supporting the same multicast communication session that includes its own target and supporting sectors. In this example, the first cluster transmits multicast media on a first interlace-multiplex (IM) pair of a downlink broadcast channel (BCH) and the second cluster transmits multicast media on a second IM pair of the downlink BCH. If sectors of the first and second clusters overlap, the network controls a manner in which the first and second clusters carry the multicast media.

50 Claims, 28 Drawing Sheets

Target Sector Deletion

U.S. PATENT DOCUMENTS

| | | | |
|---|---|---|---|
| 7,480,508 B2 | 1/2009 | Balachandran et al. | |
| 7,486,637 B2 | 2/2009 | Goldberg | |
| 7,573,837 B1 | 8/2009 | Mangal et al. | |
| 2002/0191583 A1 | 12/2002 | Harris et al. | |
| 2004/0152480 A1 | 8/2004 | Willars et al. | |
| 2004/0203756 A1 | 10/2004 | Lin et al. | |
| 2005/0152297 A1 | 7/2005 | Lee | |
| 2005/0186973 A1 | 8/2005 | Gaal et al. | |
| 2006/0058034 A1 | 3/2006 | Vaittinen et al. | |
| 2006/0126556 A1* | 6/2006 | Jiang et al. | 370/328 |
| 2006/0240773 A1 | 10/2006 | Rhee et al. | |
| 2007/0002859 A1* | 1/2007 | Corson et al. | 370/390 |
| 2007/0036118 A1 | 2/2007 | Shaffer et al. | |
| 2007/0058628 A1 | 3/2007 | Palnati et al. | |
| 2007/0082690 A1 | 4/2007 | Fabien et al. | |
| 2008/0198793 A1* | 8/2008 | Lysejko et al. | 370/328 |
| 2009/0080373 A1 | 3/2009 | Song | |

FOREIGN PATENT DOCUMENTS

| | | |
|---|---|---|
| EP | 1624610 A1 | 2/2006 |
| EP | 1734714 | 12/2006 |
| EP | 1753165 | 2/2007 |
| WO | WO9629824 A1 | 9/1996 |
| WO | WO03003762 | 1/2003 |
| WO | WO2005101870 | 10/2005 |
| WO | 2006/083121 | 8/2006 |
| WO | WO2007102057 | 9/2007 |

OTHER PUBLICATIONS

International Search Report, PCT/US2008/076978, International Searching Authority, European Patent Office, Feb. 20, 2009.

Written Opinion, PCT/US2008/076978, International Searching Authority, European Patent Office, Feb. 20, 2009.

"Universal Mobile Telecommunications System (UMTS); Introduction of the Multimedia Broadcast/Multicast Service (MBMS) in the Radio Access Network (RAN); Stage 2 (3GPP TS 25.346 version 6.6.0 Release 6); ETSI TS 125 346" ETSI Standards, LIS, Sophia Antipolis Cedex, France, vol. 3-R2, No. V6.6.0, Sep. 1, 2005, XP014031939 ISSN: 0000-0001.

European Search Report—EP11153425, Search Authority—Munich—Mar. 18, 2011..

* cited by examiner

"AT Reporting"

Target Sector Behavior

Supporting Sector Behavior

Adding a Target Sector

Adding a Target Sector

Target Sector Deletion

Removing a Target Sector

Removing a Target Sector

Support Sector Group Initialization

Support Sector Group Initialization

Support Sector Group Initialization

Neighbor Sector Group Modification

2300

Behavior of Overlapping Supporting Sectors

Behavior of Target Sector Overlapping with a Supporting Sector (Option 1)

Behavior of Target Sector Overlapping with a Supporting Sector (Option 2)

MOBILITY MANAGEMENT OF MULTIPLE CLUSTERS WITHIN A WIRELESS COMMUNICATIONS NETWORK

CLAIM OF PRIORITY UNDER 35 U.S.C. §119

The present Application for Patent claims priority to Provisional Application No. 60/974,800, entitled "Methods of Providing Mobility Support for Multicast Communications within a Wireless Communications Network", filed Sep. 24, 2007, to Provisional Application No. 60/974,808, entitled "Methods of Supporting Multicast Communications Associated with Overlapping Clusters within a Wireless Communication Network", filed on Sep. 24, 2007, and to Provisional Application No. 60/974,814, entitled "Methods for Providing Mobility Support for Multicast Communication within a Wireless Communications Network", filed Sep. 24, 2007, each of which is assigned to the assignee hereof and hereby expressly incorporated by reference herein in its entirety.

BACKGROUND OF THE INVENTION

1. Field of the Invention

The invention relates to communications in a wireless telecommunication network and, more particularly to methods of mobility management of multiple clusters within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Methods of mobility management within a wireless communications network including a plurality of sectors are provided. In an example, the wireless communications network includes a first cluster of sectors with at least one target sector and at least one supporting sector. The target sectors are sectors where a target access terminal for a multicast communication session is expected. The supporting sectors are sectors where target access terminals are not expected, and are configured to support the target sectors. The multicast communication session is carried within both the target and supporting sectors. In an example, the supporting sectors are determined based on neighbor sectors of the target sectors. In another example, the supporting sectors are determined based on a supporting sector value that corresponds to a number of sectors for supporting the target sector. In another example, a second cluster can be included within the network for supporting the same multicast communication session that includes its own target and supporting sectors. In this example, the first cluster transmits multicast media on a first interlace-multiplex (IM) pair of a downlink broadcast channel (BCH) and the second cluster transmits multicast media on a second IM pair of the downlink BCH. If sectors of the first and second clusters overlap, the network controls a manner in which the first and second clusters carry the multicast media.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
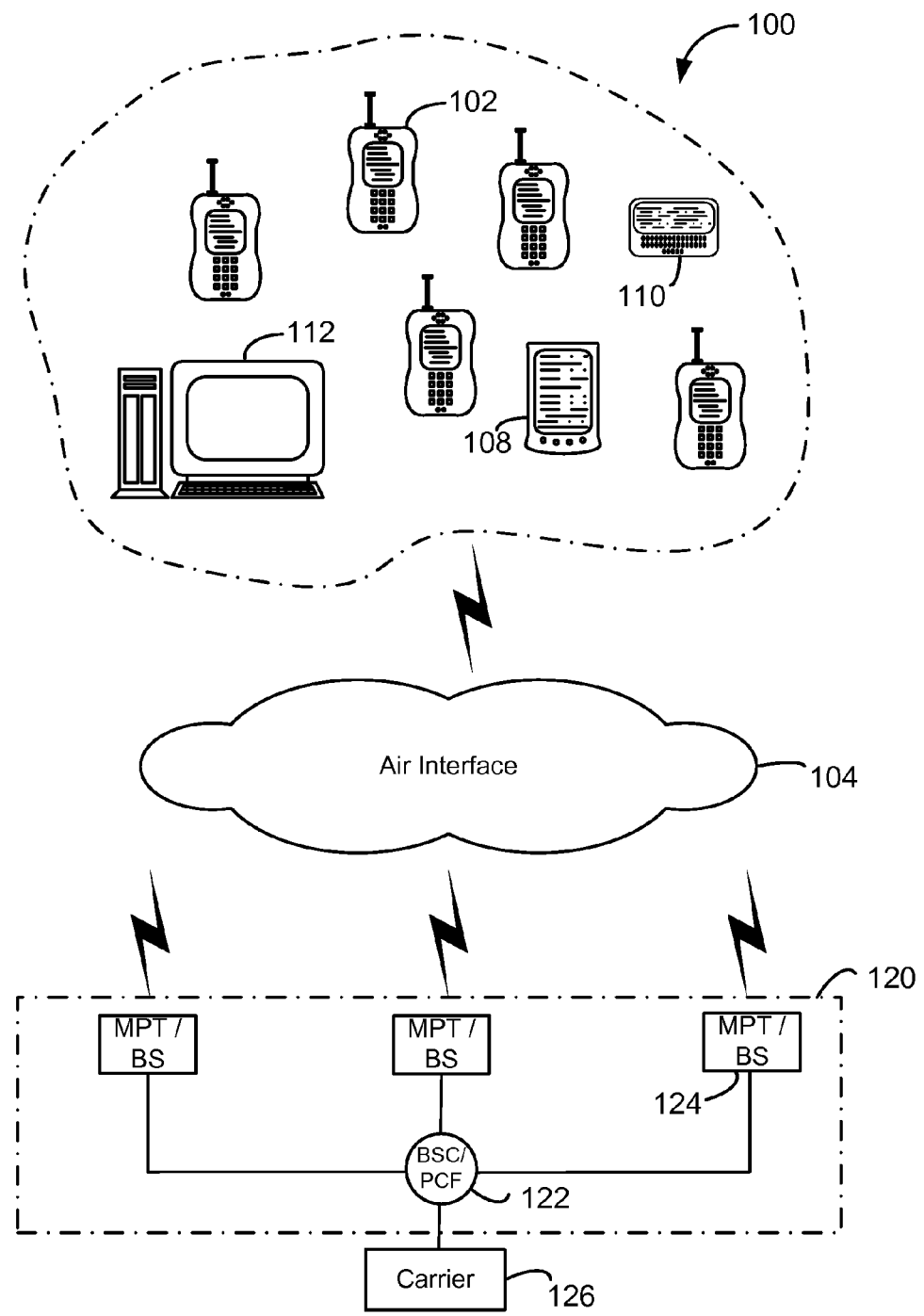
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104.

The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
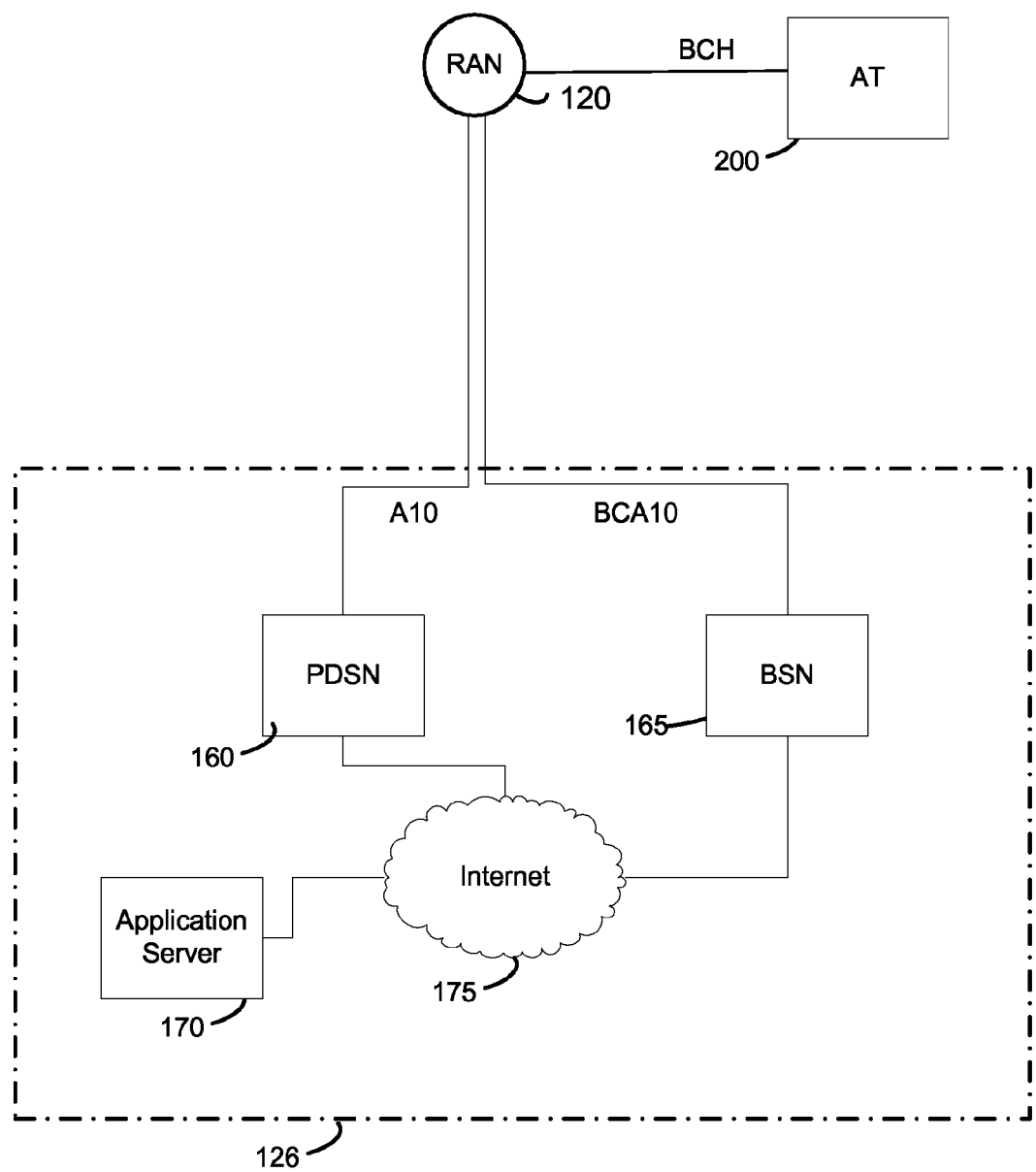
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
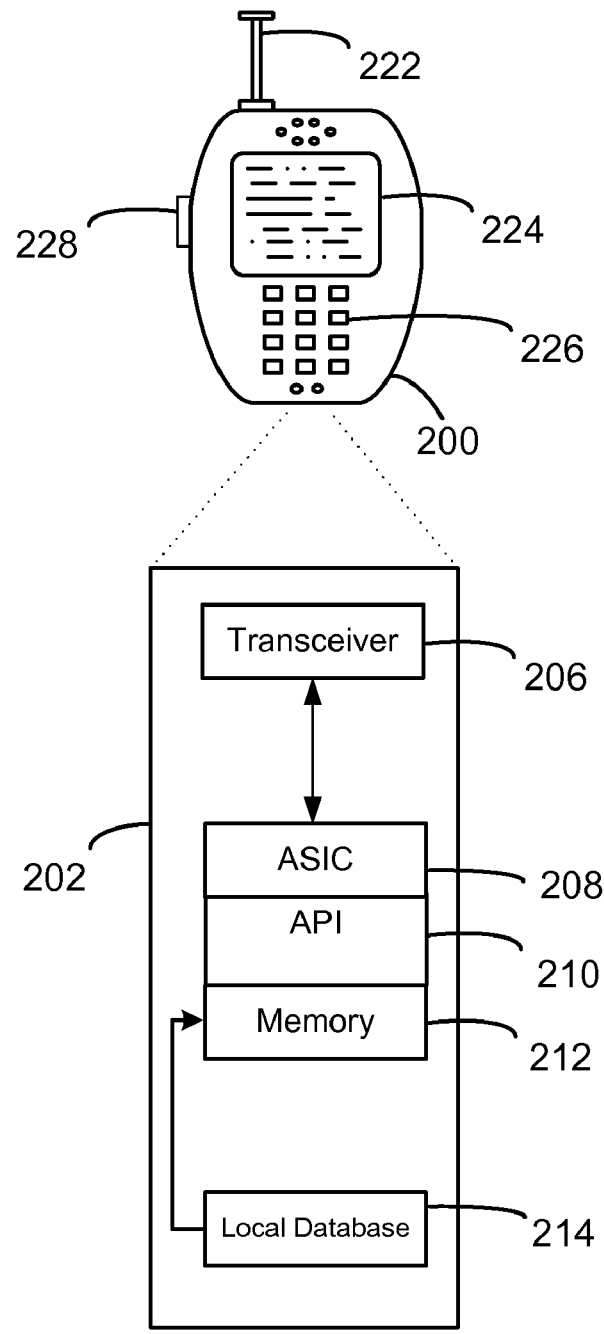
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

For communicating a given access terminal's desire to speak to a given multicast group once the user has joined a standing call group, the mobile station or access terminal transmits appropriate control messages to the application server 170, which may be configured to support push-to-talk (PTT) functionality, and may thereby be referred to as a "PTT application server". Once the user is granted the floor, the user's voice or other data is transmitted to the RAN 120 and on to the PTT application server 170. The data is in turn processed by the PTT application server 170 and routed back to the RAN 120 for transmission to the other mobile stations or access terminals in the call group as a broadcast multicast service (BCMCS) flow. As used herein, a "BCMCS flow" is a packet data stream transmitted according to BCMCS protocols/procedures. The PTT application server 170 may transmit various control messages to inform call group members of when user data is being carried on their group channel.

BCMCS protocols use a downlink broadcast channel (BCH) (e.g., such as a High Rate Broadcast Multicast Packet Data Air Interface) to deliver content to subscribers to one or more multicast groups. Unlike 1x-EVDO's forward-link point-to-point traffic channels in which associated reverse link channels provide various acknowledgements and ongoing forward link channel quality feedback (e.g., as may be the case in transmissions between a base station and mobile station in a CDMA network), there is no reverse link channel associated with the BCH. In other words, in order to scale the number of multicast group members in a given multicast group without necessitating additional delays due to waiting for acknowledgments, conventional BCMCS protocols provide for an unacknowledged delivery of packet data streams. Generally, multicast messaging for a particular multicast group, which may correspond to a series of multicast packets being sent on the BCH from the RAN 120 to one or more multicast group members may be referred to as a "flow" in the RAN 120, and each flow is allocated a unique BCMCS flow identifier or BCMCS flow ID (e.g., alternatively referred to as BCMCS_FLOW_ID, BCMCSFlowID, etc).

Broadcast overhead messages (BOMs) carried over the 1x-EVDO forward link in a conventional BCMCS system inform the mobile stations or access terminals of the BCMCS flows which are currently being carried in a particular sector. They also provide information on which forward link physical layer timeslots should be decoded to receive the desired packet flows, and information on the number of physical layer slots per broadcast physical layer packet and physical layer rate used to transmit the flow (so-called "logical to physical mapping"). Accordingly, BOMs inform multicast group members which slot or slots to "tune" on the BCH for one or more BCMCS flows. Conventionally, BOMs are sent periodically, such as, for example, once every 426 milliseconds, on a reversed slot or slots of a downlink control channel cycle.

Conventionally, when an access terminal enters a new cell or sector (e.g., upon power-up, after a handoff, etc.), the access terminal decodes received BOM's and looks for flow identifiers associated with its static multicast groups. If one or more desired BCMCS flows are not indicated in the BOM, then the access terminal 90 may send an autonomous BCMCS flow registration message requesting one or more BCMCS flows. A BCMCS flow registration may also be sent if explicitly solicited by the RAN 120 via a given register field within the BOM, such as a register for dynamic broadcast (RFDB) field or a register for paging (RFP) field. While embodiments of the present invention are described below as either suppressing or prompting AT feedback based on a logic level setting of the RFDB field, it will be appreciated that alternative embodiments of the present invention may be directed to prompting/suppressing AT feedback via the RFP field of the BOM and/or any other well-known field sent on a downlink scheduling message, such as a BOM.

Generally, if the RFDB is set to a first logic level (e.g., a higher logic level or logic "1") for a BCMCS flow 1A within the BOM (e.g., RFDB=1, BCMCS flow=1A), then all multicast group members within the sector receiving the BOM and members of the multicast group corresponding to BCMCS flow 1A either send or re-send the BCMCS flow registrations for BCMCS flow 1A. Otherwise, if the RFDB is set to a second logic level (e.g., a lower logic level or logic "0") for a BCMCS flow 1A within the BOM (e.g., RFDB=0, BCMCS flow=1A), then multicast group members monitoring BCMCS flow 1A on the BCH within the sector receiving the BOM do not send or re-send BCMCS flow registrations for BCMCS flow 1A.

If a given BCMCS flow is carried on the BOM and associated with an RFDB field where RFDB=1, a BCMCS flow registration message may be triggered from one or more ATs within the sector. However, as the number of ATs within a given sector increase, the number of BCMCS flow registration messages may likewise increase, which may waste system resources on the access channel.

As discussed above, BCMCS registration messages in high-density sectors of a wireless communications network may become problematic and degrade system resources. Accordingly, an embodiment of the present invention will now be described wherein the number of BCMCS flow registration messages may be reduced via more efficient multicast group sector management, and the RAN 120 may be better able to handle high-density sectors as well as mobility of multicast group members between sectors.

Figure 4:
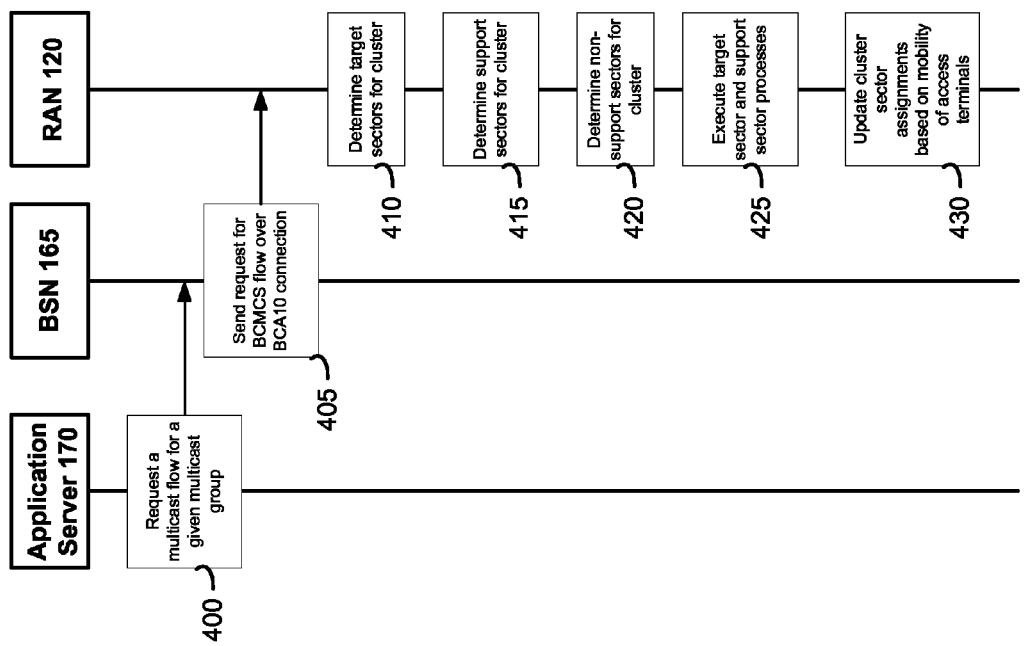
FIG. 4 illustrates a cluster initialization process according to an embodiment of the present invention.

FIG. 4 illustrates a cluster initialization process according to an embodiment of the present invention. Referring to FIG. 4, in 400, the application server 170 issues a request to initiate a multicast flow for a given multicast group. For example, the multicast flow generated in 400 of FIG. 4 may be responsive to a given access terminal's request to speak to the given multicast group (not shown). After the application server 170 decides to accept the request, the user's voice or other data is transmitted to the RAN 120 and on to the PTT application server 170, after which the multicast flow may be generated as in 400 of FIG. 4. The application server 170 forwards the multicast flow to the BSN 165 in 405, and the BSN 165 forwards the BCMCS flow over the BCA10 connection to the RAN 120, which is responsible for transmitting the multicast messages of the BCMCS flow to the multicast group members via the air interface in one or more sectors, in 410.

In 410 of FIG. 4, the RAN 120 determines an initial set of target sectors for an initial "cluster". As used herein, a target sector is any sector within a wireless communication system having at least one multicast group member. As used herein, a "cluster" corresponds to a set of sectors (e.g., one or more sectors) upon which the BCH carries the BCMCS flow for a particular multicast group. As will be described below in greater detail, the cluster includes both target sectors and supporting sectors for a particular multicast group or BCMCS flow.

Returning to 410 of FIG. 4, the RAN 120 may determine the initial set of target sectors in any of a number of ways. For example, the determination may be based on "group member reports" periodically provided to the RAN 120 from one or more ATs within a wireless communication system.

Figure 5:
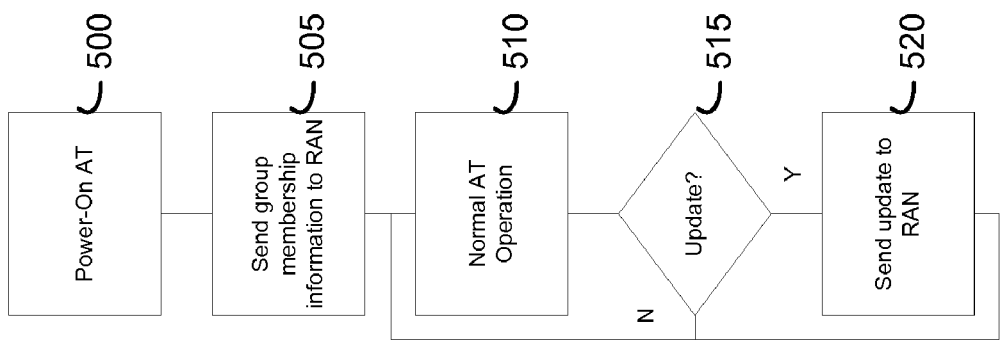
FIG. 5 illustrates a group member reporting process according to an embodiment of the present invention.

FIG. 5 illustrates a group member reporting process according to an embodiment of the present invention. Referring to FIG. 5, in 500, a given AT belonging to one or more multicast groups powers on. After the given AT powers up, the given AT sends group membership information ("group member report") to the RAN 120 in 505 (e.g., after locating a pilot signal sent by one or more base stations within the RAN 120, and/or performing any other initial power-up procedures). For example, the group membership information provided by the given AT may include a designation of each multicast group or BCMCS flow to which the given AT wishes to belong. In an example, the group member reports may be included within a standard BCMCS flow registration message, or alternatively may be included within a proprietary or non-standard message, such as a group membership notification (GMN) message encapsulated in a Storage-BLOBNotification message on the uplink. For example, the GMN may include a list of BCMCS flow IDs and/or multicast IP addresses and port numbers.

In 510 of FIG. 5, after reporting the group membership information, the given AT resumes normal operation (e.g., enters idle mode, makes voice calls, plays video games, etc.). In 515, the given AT determines whether to update its location information with a supplemental "route update" report, or alternatively whether to update its group membership information with a supplemental group membership report. The determination of step 515 may be performed in any of a number of ways. For example, the determining step 515 may be based on a distance-based registration (DBR) protocol, such that the given AT updates its location information after traversing a given distance (e.g., based on which sector the given AT has traversed, etc.). The given distance may be based on to which base stations the given AT has been handed off, which base stations the given AT has been monitoring while in an idle state, etc. In an alternative example, the determination of 515 may be based on a given period, such that the given AT provides a report to the RAN 120 once for each period. In another alternative example, the given AT may send a route update report or location update to the RAN 120 each time the given AT enters a new location area (LA), where each LA corresponds to a portion of a subnet or PCF area (e.g., as defined by the RAN 120). In another alternative example, the determining 515 may be based on whether the given AT wishes to change its group membership information (e.g., the given AT wants to monitor a new multicast group communication, wants to stop monitoring a previously requested multicast group communication, etc.).

If the given AT determines not to update its location information and/or its group membership information in 515, the process of FIG. 5 returns to 510 and the given AT resumes normal operation. Otherwise, in 520, the given AT sends a supplemental report (e.g., one or more of a location or route update report or a supplemental group membership report) to the RAN 120 before returning to 510 of FIG. 5.

While the multicast group members or ATs provide group member reports to the RAN 120, the RAN 120 monitors the reports. The RAN 120 maintains a database including the number of ATs belonging to any particular group, which ATs belong to which group, how recently each group member has provided a group member report, a position (e.g., sector) of each group member, etc. The position of each group member may be stored at the RAN 120 as being within a particular multicast area (MA), where each MA corresponds to a group of contiguous sectors which potentially serve one or more group members (e.g., "potentially" because the location of the group members may not be in the granularity of a sector because the group members may not respond to an interactive multicast message, etc.). In an example, more than one MA may be identified for a group if group members are geographically dispersed.

The process of FIG. 5 is described in more detail within Provisional Application No. 60/974,830, entitled "Methods of tracking locations of multicast group members within a wireless communication system", filed Sep. 24, 2007, assigned to the assignee hereof and hereby expressly incorporated by reference herein in its entirety.

Accordingly, returning to 410 of FIG. 4, the initial set of target sectors may be determined based on information provided within the group member reports from the ATs and maintained at the RAN 120. However, it will be appreciated that the initialization of the cluster in 410 of FIG. 4 may be performed in any number of ways. For example, all sectors may initially be set as "supporting sectors", after which each sector tests whether any multicast group members are present, thereby establishing which sectors are targets. This example will be appreciated upon a review of FIGS. 8 and 12-14 below.

Next, in 415 of FIG. 4, the RAN 120 determines an initial set of supporting sectors for the BCMCS flow. In an example, the initial set of supporting sectors may be based on the initial set of target sectors. For example, the supporting sectors may correspond to any sector adjacent to one or more target sectors which itself is not a target sector. Alternatively, a supporting sector may correspond to a sector in a given proximity to a target sector without actually being adjacent to the target sector.

In 420 of FIG. 4, the RAN 120 determines an initial set of non-supporting sectors for the BCMCS flow. The initial set of non-supporting sectors for the BCMCS flow includes any sector within the wireless system 100 which is neither a target sector as determined in 410 of FIG. 4 nor a supporting sector as determined in 415 of FIG. 4.

In 425 of FIG. 4, the RAN 120 executes target sector and supporting sector processes at the respective target and supporting sectors. An example target sector process is described below with respect to FIG. 7, while an example supporting sector process is described below with respect to FIG. 8. Next, in 430 of FIG. 4, the RAN 120 updates the sector assignments of the cluster (e.g., adds new target/supporting sectors, removes target/supporting sectors, etc.), as will be described in greater detail below with respect to FIGS. 9 through 14.

Figure 6:
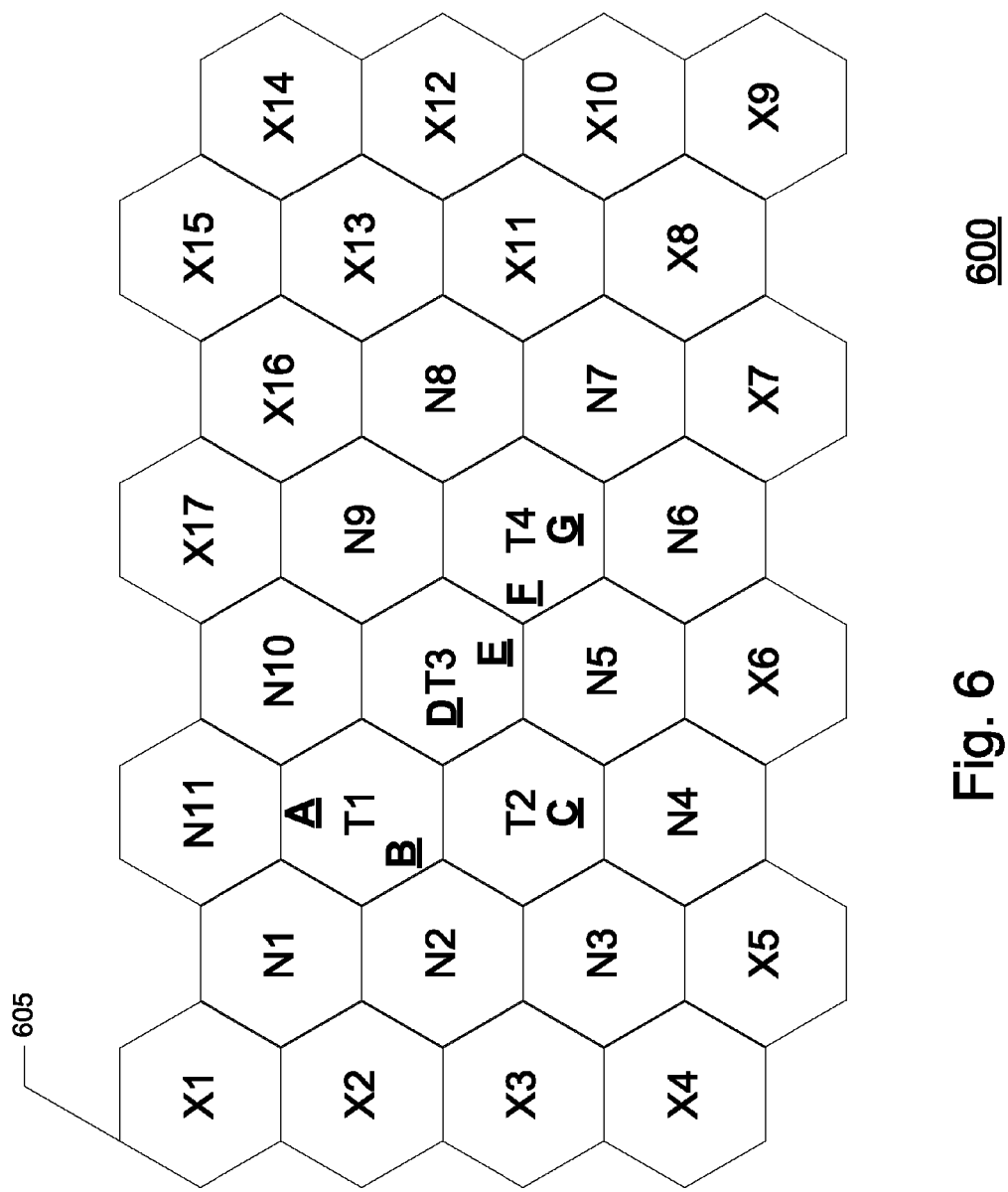
FIG. 6 illustrates a wireless communication system 600 formed in accordance with the process of FIG. 4.

FIG. 6 illustrates a wireless communication system 600 formed in accordance with the process of FIG. 4. As shown in FIG. 6, the wireless communication system 600 includes a plurality of sectors 605. Among the plurality of sectors 605 are the initial set of target sectors determined in 410 of FIG. 4, denoted as T1 through T4, the initial set of supporting sectors determined in 415 of FIG. 4, denoted as N1 through N11, and the initial set of non-supporting sectors determined in 420 of FIG. 4, denoted as X1 through X17. As shown in the initial configuration of the cluster in FIG. 6, target sector T1 includes multicast group members A and B, target sector T2 includes multicast group member C, target sector T3 includes multicast group members D and E, and target sector T4 includes multicast group members F and G.

Examples of target sector behavior, supporting sector behavior, and non-supporting sector behavior will now be described with respect to FIGS. 7 and 8.

Figure 7:
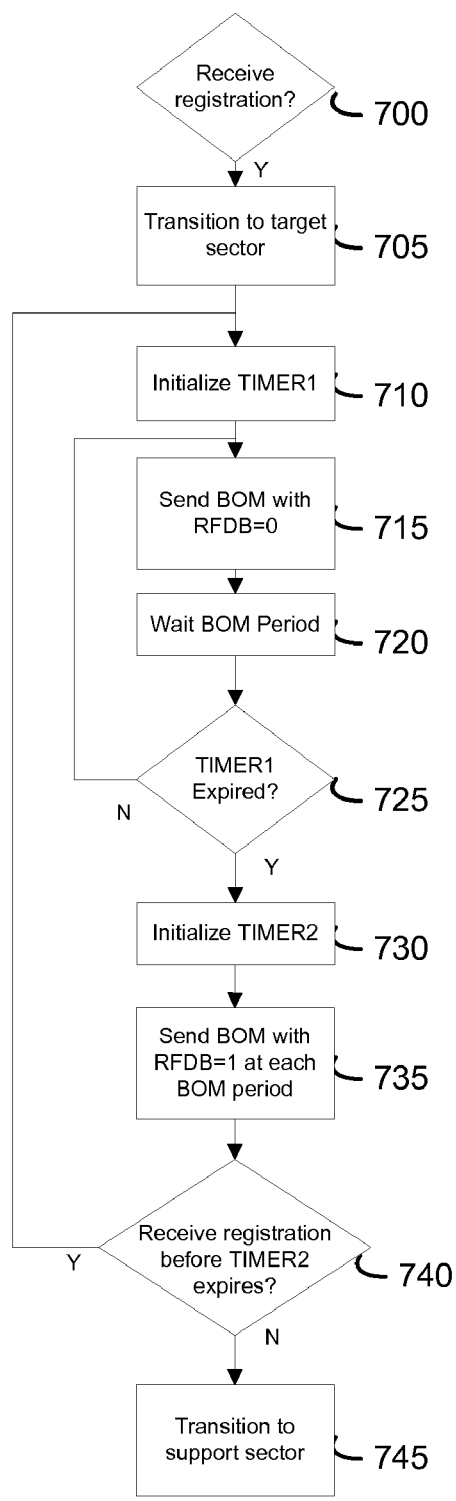
FIG. 7 illustrates target sector behavior according to an embodiment of the present invention.

FIG. 7 illustrates target sector behavior according to an embodiment of the present invention. Referring to FIG. 7, the RAN 120 for a given initial cluster (initial target sectors determined in 410 and initial supporting sectors determined in 415) determines whether a BCMCS flow registration message has been received from one or more access terminals in one of the sectors. If the RAN determines that a BCMCS flow registration message for a given BCMCS flow ("T_FLOW") has been received, the process advances to 705 where the given initial target sectors transitions to a target sector ("TARGET"). If the RAN determines that a BCMCS flow registration message for a given BCMCS flow ("T_FLOW") has been received, the process advances to 705 where the given initial target sectors transitions to a target sector ("TARGET"). Also, the RAN 120 for a given non-target sector (e.g., a non-supporting sector, a supporting sector, etc.) determines whether a BCMCS flow registration message has been received from one or more access terminals. If the RAN determines that a BCMCS flow registration message for a given BCMCS flow ("T_FLOW") has been received, the process advances to 705 where the given non-target sector transitions to a target sector ("TARGET"). As discussed above, target sectors carry the BCMCS flow on the BCH, and transmit BOMs as will be described below.

In 710 of FIG. 7, the RAN 120 initializes a first timer TIMER1 for the target sector TARGET. In an example, the first timer TIMER1 may be established by a system designer based on any well-known performance criteria (e.g., a longer period may be selected to advertise the BCMCS flow longer and reduce congestion, etc.). In 715, the RAN 120 in the target sector TARGET transmits a BOM advertising the BCMCS flow T_FLOW and setting RFDB to 0, denoted as BOM[BCMCS: T_FLOW; RFDB=0]. After transmitting the BOM, the RAN 120 for the target sector TARGET waits a given BOM period (e.g., a periodic interval between successive BOMs as determined by a system designer) in 720 of FIG. 7. Next, in 725, the RAN 120 determines whether the first timer TIMER1 has expired. If the first timer TIMER1 has not expired, the process returns to 715 of FIG. 7; otherwise, the process advances to 730 of FIG. 7.

In 730 of FIG. 7, the RAN 120 initializes a second timer TIMER2 for the target sector TARGET. In an example, the second timer TIMER2 may be established by a system designer based on any well-known performance criteria (e.g., a longer period may be selected to wait for a BCMCS flow registration message for a longer period of time before transitioning to a supporting sector, etc.). For example, the second timer TIMER2 may be set to a longer period than that of the BOM period to guarantee that at least one BOM is sent. Accordingly, in 735, the RAN 120 in the target sector TARGET transmits a BOM by setting RFDB to 1, denoted as BOM[BCMCS: T_FLOW; RFDB=1]. After transmitting the BOM, the RAN 120 determines whether a BCMCS flow registration message has been received for the target sector TARGET before the timer TIMER2 expires in 740 of FIG. 7. If one or more BCMCS flow registration messages are received before the expiration of the second timer T2, the process returns to 710 of FIG. 7. Otherwise, if no BCMCS flow registration messages are received before the expiration of the second timer TIMER2, the process advances to 745 and the target sector TARGET transitions to a supporting sector ("SUPPORT").

As illustrated in FIG. 7 and described above, the first timer TIMER1 corresponds to a period where the BOM advertises the BCMCS flow T_FLOW and sets RFDB=0 to suppress AT feedback, whereas the second timer TIMER2 corresponds to a period where the BOM advertises the BCMCS flow T_FLOW and sets RFDB=−1. However, in an alternative embodiment, the second timer TIMER2 may correspond to a period where the BOM is not advertised at all. Thus, in this alternative embodiment, feedback is prompted by the lack of advertising for the BCMCS flow. The alternative embodiment discussed above may, for example, reduce congestion.

Figure 8:
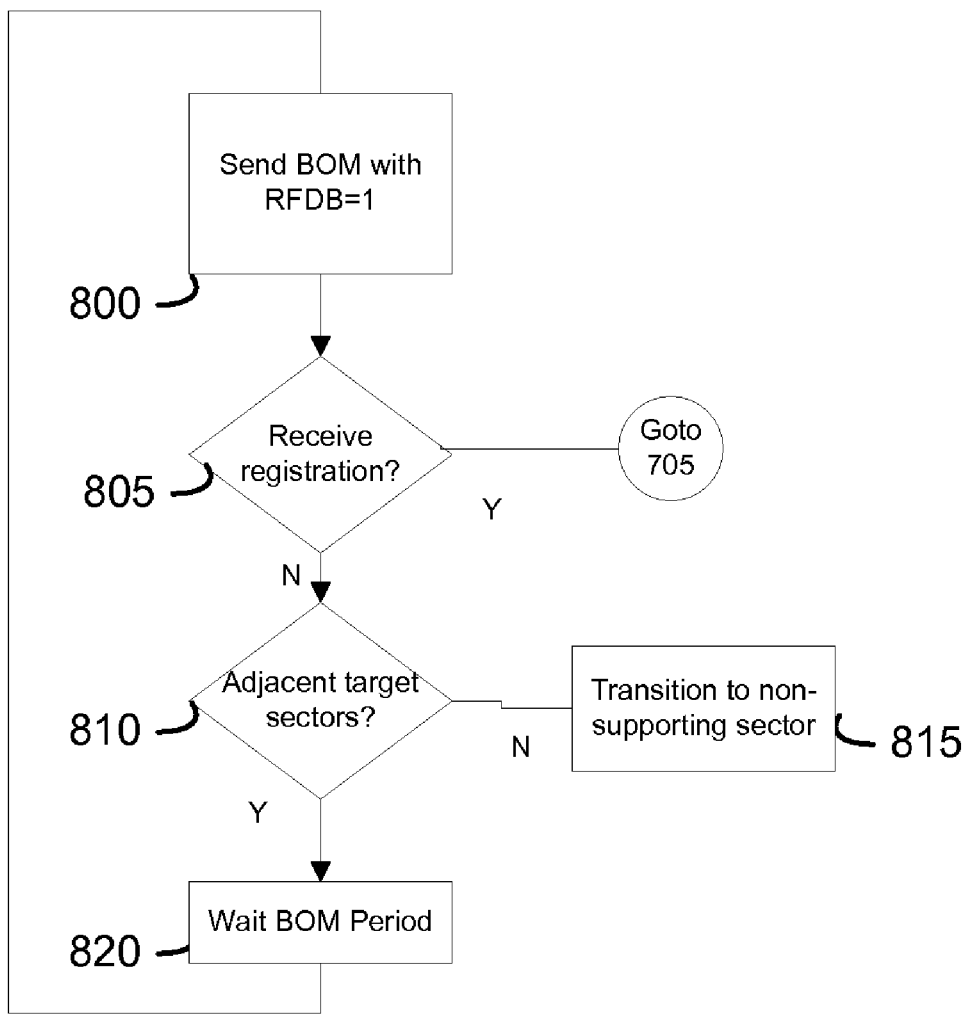
FIG. 8 illustrates supporting sector behavior according to an embodiment of the present invention.

FIG. 8 illustrates supporting sector behavior according to an embodiment of the present invention. Supporting sectors carry the BCMCS flow on the BCH in the same manner as target sectors, and supporting sectors transmit BOMs as will be described below. For example, supporting sectors may be configured to carry the BCMCS flow on the BCH even though there are no actual multicast group members known to be present therein in order to cause a "combining" or "soft combining" effect, wherein BCMCS flows generated in supporting (e.g., which may be adjacent, in a given proximity, etc.) sectors assist ATs are used collectively to help decode BCMCS flows. Combining and soft combining are well-known in the art and will not be described in greater detail for the sake of brevity.

Referring to FIG. 8, in 800, the RAN 120 in the supporting sector SUPPORT transmits a BOM advertising the BCMCS flow and setting RFDB to 1, denoted as BOM[BCMCS: T_FLOW; RFDB=1]. Next, in 805, the RAN 120 in the supporting sector SUPPORT determines whether any BCMCS flow registrations for T_FLOW have been received. If one or more BCMCS flow registration messages for T_FLOW are determined to have been received, the process advances to 705 of FIG. 7 and the supporting sector SUPPORT transitions to a target sector TARGET. Otherwise, the process advances to 810. In 810 of FIG. 8, the RAN 120 determines whether any adjacent target sectors are present relative to the supporting sector SUPPORT. If no adjacent target sectors are detected, the process advances to 815. In 815 of FIG. 8, the supporting sector SUPPORT is transitioned to a non-supporting sector ("NON-SUPPORT"). After transitioning to the non-supporting sector NON-SUPPORT, the non-sector supporting sector NON-SUPPORT does not carry the BCMCS flow for T_FLOW on the BCH and does not transmit BOMs for the BCMCS flow T_FLOW.

Returning to 810, if one or more adjacent target sectors are determined to be present, the RAN 120 for the supporting sector SUPPORT waits the given BOM period in 820, and then returns to 800.

Figure 9:
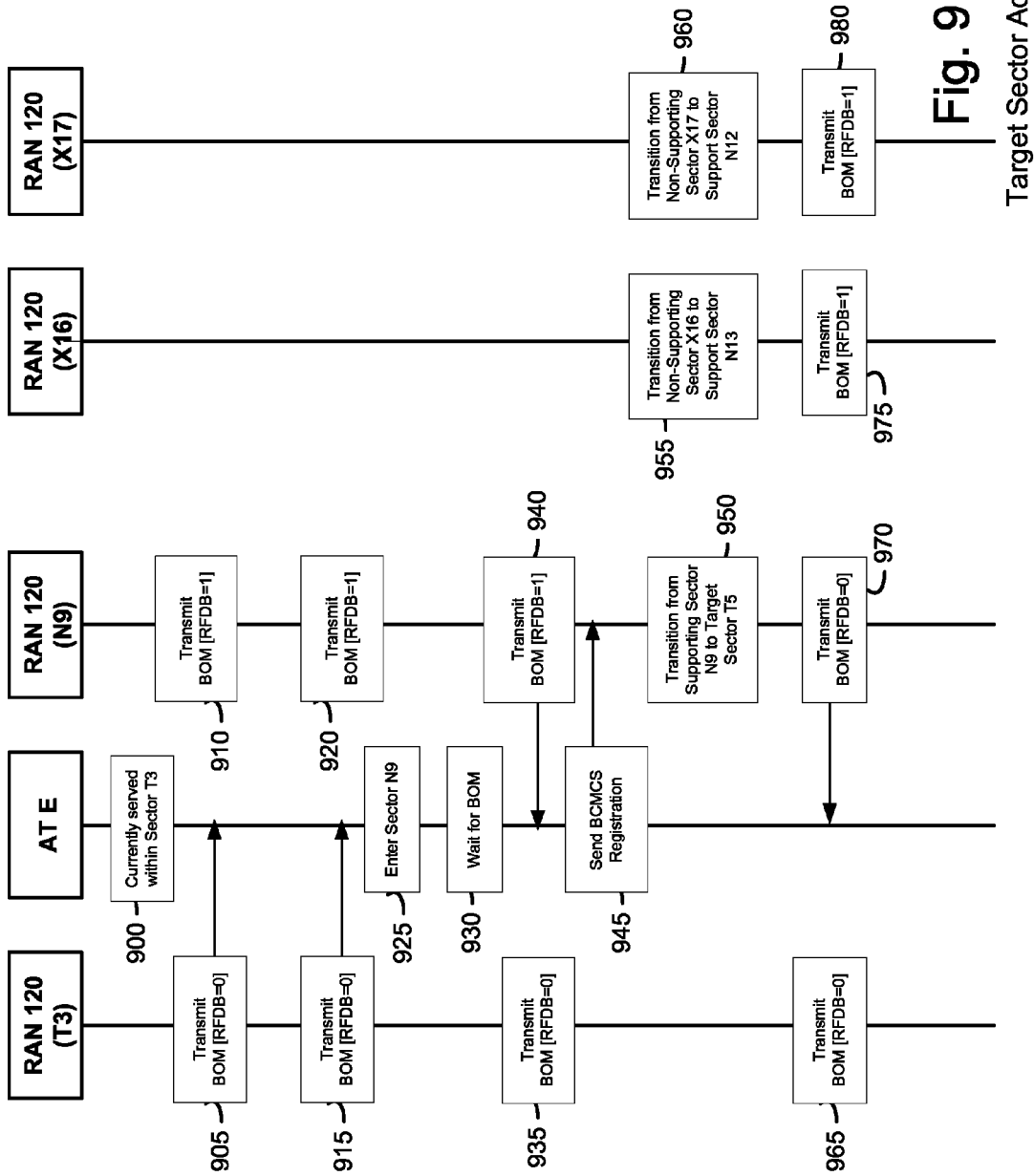
FIG. 9 illustrates a target sector addition process according to an embodiment of the present invention.

FIG. 9 illustrates a target sector addition process according to an embodiment of the present invention. Below, the process of FIG. 9 will be described as adding a target sector to the cluster configuration illustrated in FIG. 6. Accordingly, in 900 of FIG. 9, assume AT E is being served within target sector T3 as illustrated in the cluster configuration of FIG. 9, and is receiving a given BCMCS flow T_FLOW on the BCH.

In 905 of FIG. 9, in target sector T3, the RAN 120 transmits a BOM indicating the BCMCS flow T_FLOW along with a register for dynamic broadcast (RFDB) set to the second logic level (e.g., a lower logic level or logic "0"), which may be denoted as BOM[BCMCS: T_FLOW; RFDB=0]. Accordingly, the BOM sent by the RAN 120 in target sector T3 in 905 of FIG. 9 instructs multicast group members which are "listening" to the BCMCS flow T_FLOW not to send a BCMCS flow registration message for the BCMCS flow T_FLOW (e.g., see 715 of FIG. 7). In contrast, the RAN 120 in supporting sector N9, which is also transmitting the BCMCS flow T_FLOW on the BCH, transmits the BOM indicating the BCMCS flow T_FLOW along with a register for dynamic broadcast (RFDB) set to the first logic level (e.g., a higher logic level or logic "1"), which may be denoted as BOM [BCMCS: T_FLOW; RFDB=1] (e.g., see 800 of FIG. 8). Accordingly, the BOM sent by the RAN 120 in supporting sector N9 in 910 of FIG. 9 instructs multicast group members which are "listening" to the BCMCS flow T_FLOW and present within supporting sector N9, if any are present, to send a BCMCS flow registration message for the BCMCS flow T_FLOW. Hereinafter, for the sake of simplicity, the BOM sent by the RAN 120 in target sector T3 in 905 may be denoted as BOM[BCMCS: T_FLOW; RFDB=0], and the BOM sent by the RAN 120 in supporting sector N9 in 910 may be denoted as BOM[BCMCS: T_FLOW; RFDB=1].

After waiting the given BOM period (e.g., see 720 of FIG. 7, 820 of FIG. 8), the RAN 120 at target sector T3 resends the BOM in 915 (e.g., configured the same as 905), and the RAN 120 at supporting sector N9 resends the BOM in 920 (e.g., configured the same as 910).

Figure 10:
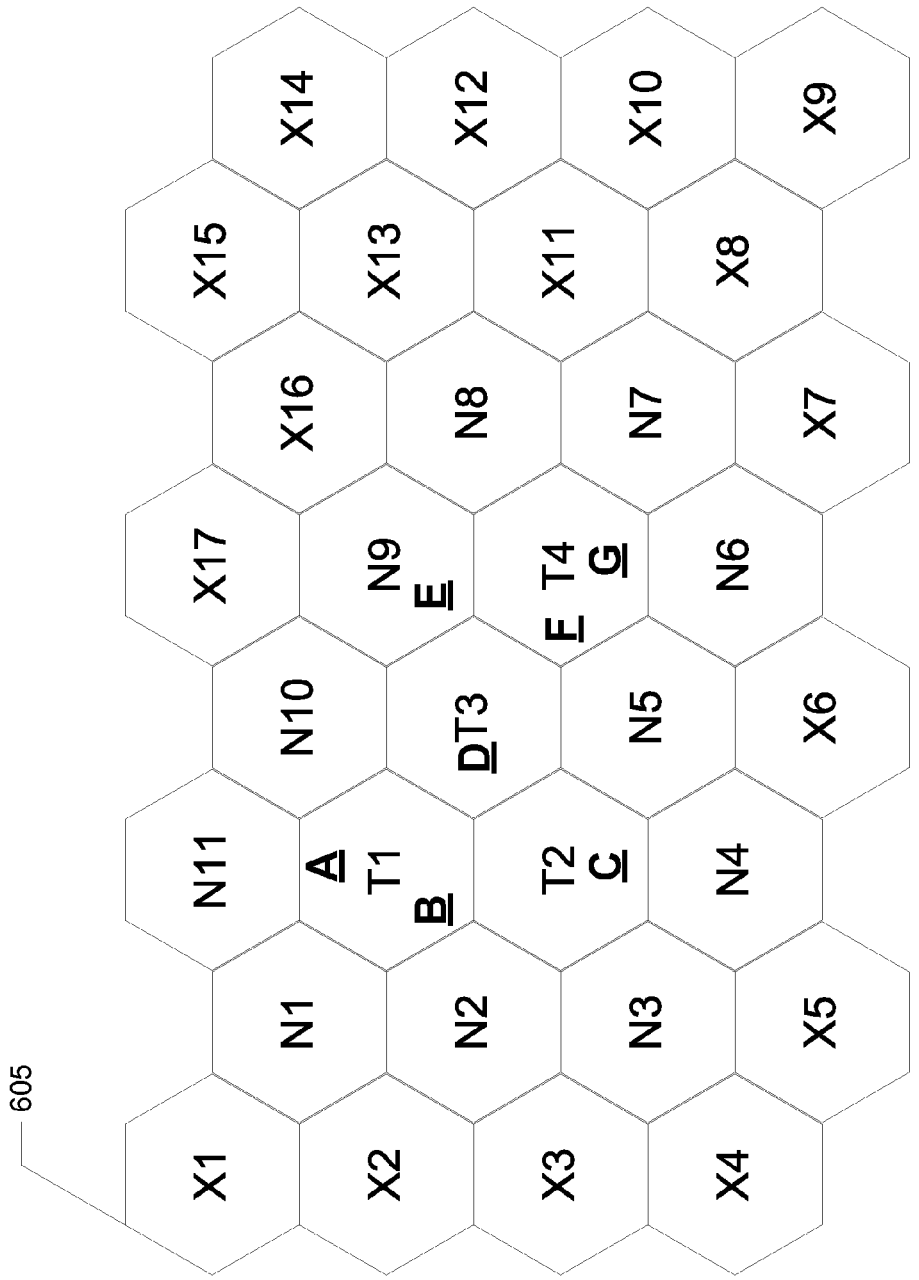
FIGS. 10 and 11 illustrate the wireless communication of FIG. 6 during the target sector addition process of FIG. 9.
Figure 11:
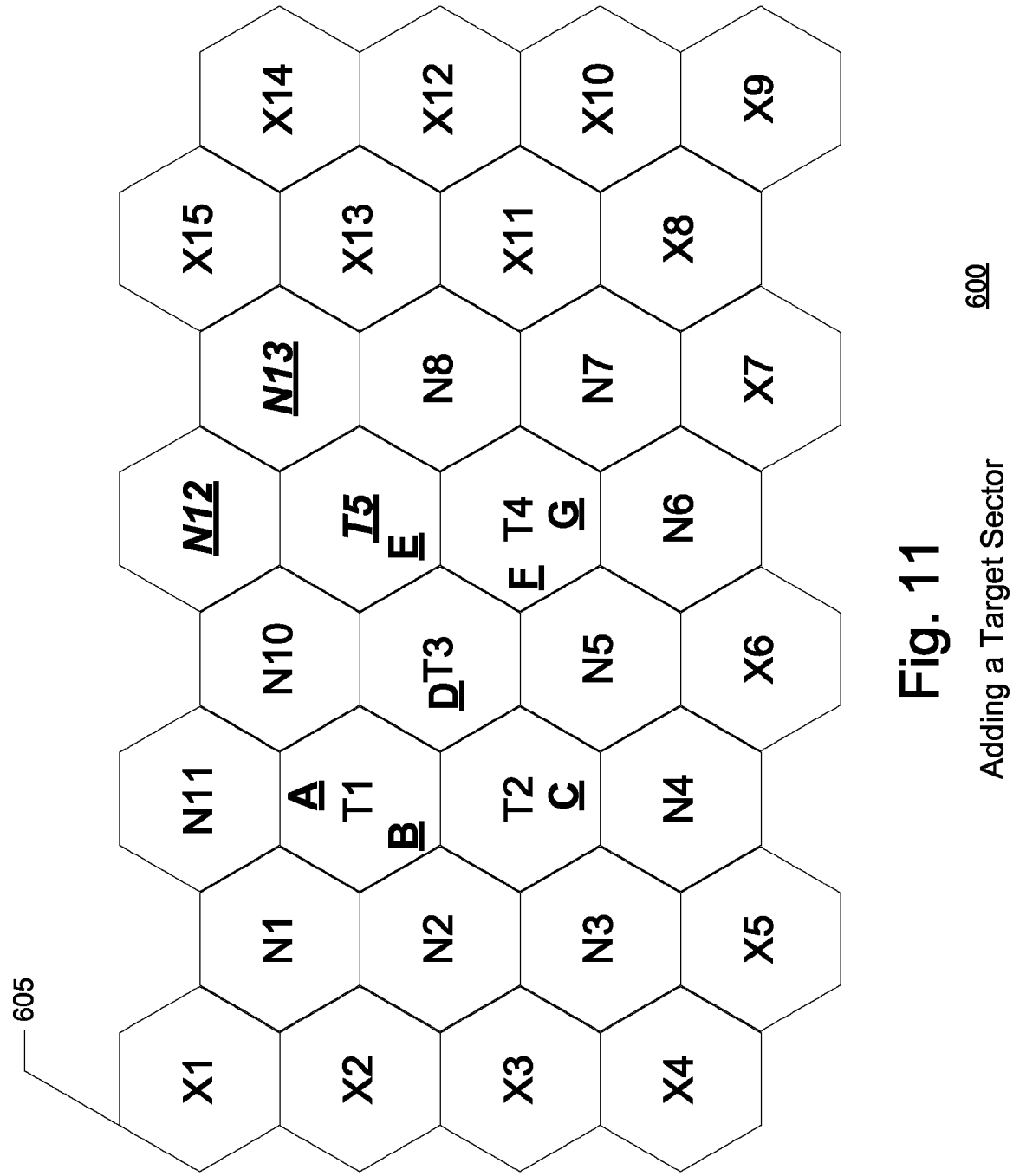

Next, in 925 of FIG. 9, the AT E leaves the target sector T3 and enters the supporting sector N9, as shown in FIG. 10. In 930 of FIG. 9, the AT E waits a short period of time (e.g., equal to a BOM period) to determine whether a BCMCS flow registration message needs to be transmitted for the new sector (e.g., no BCMCS flow registration message need be transmitted if the new sector is already a target sector). In 935, the RAN 120 for target sector T3 transmits another BOM [BCMCS: T_FLOW; RFDB=0] because the target sector T3 is still an active target sector (e.g., AT D is still present within T3 as shown in FIG. 10, and the RAN 120 at target sector T3 is not yet aware that AT E is no longer in T3) and it is assumed that the first timer TIMER1 for the target sector T3 has not expired (e.g., see 725 of FIG. 7). In 940 of FIG. 9, the RAN 120 in supporting sector N9 again transmits BOM[BCMCS: T_FLOW; RFDB=1]. In 945, the AT E receives the BOM [BCMCS: T_FLOW; RFDB=1] and interprets the BOM as a request to send a BCMCS flow registration message. Accordingly, the AT E sends the BCMCS flow registration message for T_FLOW in 945. Next, having received a BCMCS flow registration message, the supporting sector N9 transitions to target sector T5 in 950 (e.g., see 805 of FIG. 8), as shown in FIG. 11. Likewise, as shown in FIG. 11, the RAN 120 instructs non-supporting sectors X1 and X17 to transition into supporting sectors N13 and N12, respectively, in 955 and 960, respectively, of FIG. 9.

Next, the RAN 120 transmits the BOMs in the sectors T3, T5, N12 and N13 as BOM[BCMCS: T_FLOW; RFDB=0], BOM[BCMCS: T_FLOW; RFDB=0], BOM[BCMCS: T_FLOW; RFDB=1], BOM[BCMCS: T_FLOW; RFDB=1], respectively, in 965, 970, 975 and 980, respectively, of FIG. 9, in accordance with the processes of FIGS. 7 and/or 8.

Thus, as shown in the description of FIGS. 9, 10 and 11, a new target sector (i.e., T5) has been "added" to the cluster for BCMCS flow T_FLOW. Likewise, previous non-supporting sectors X16 and X17 transition to supporting sectors N13 and N12, respectively, because the new target sector T5 is adjacent to the old non-supporting sectors X16 and X17. A process for removing target/supporting sectors from the cluster for the BCMCS flow T_FLOW will now be described in greater detail.

Figure 12:
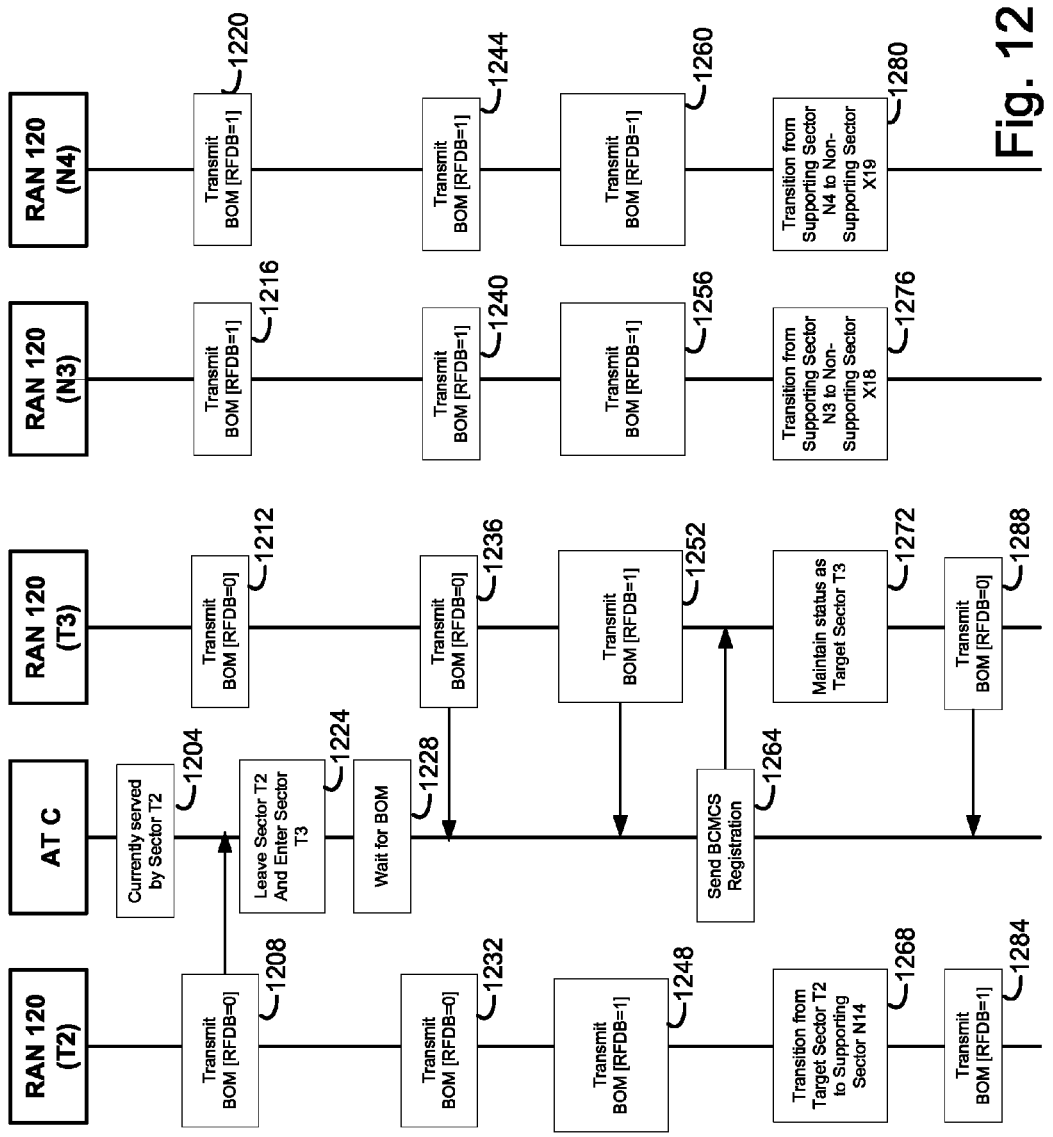
FIG. 12 illustrates a target sector removal process according to an embodiment of the present invention.

FIG. 12 illustrates a target sector removal process according to an embodiment of the present invention. Below, the process of FIG. 12 will be described as removing a target sector from the cluster configuration illustrated in FIG. 11. Accordingly, in 1204 of FIG. 12, assume AT C is being served within target sector T2 as illustrated in the cluster configuration of FIG. 11, and is receiving a given BCMCS flow T_FLOW on the BCH.

Figure 13:
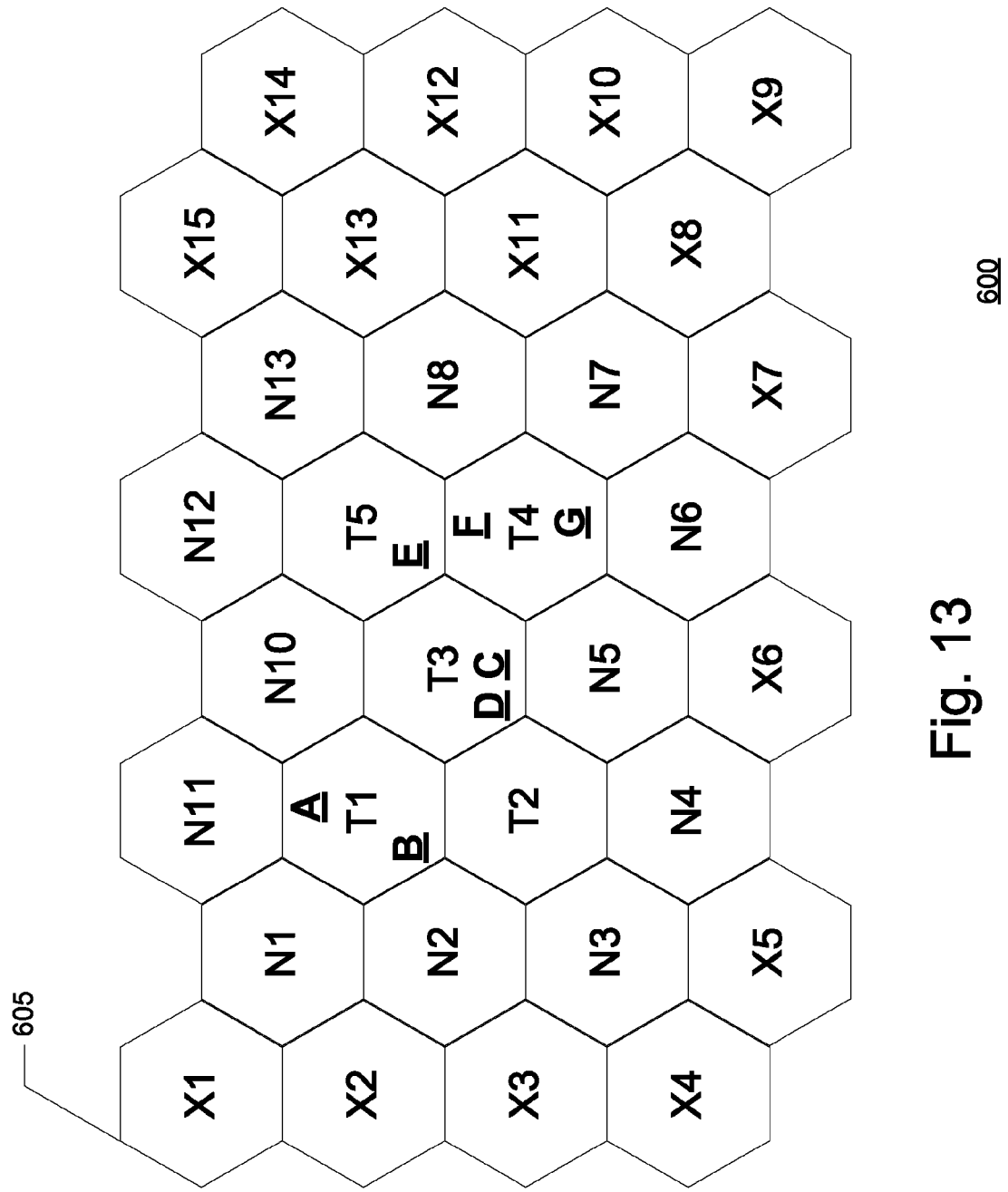
FIGS. 13 and 14 illustrate the wireless communication of FIG. 6 during the target sector removal process of FIG. 12.

Next, in each of sectors T2, T3, N3 and N4, the RAN 120 transmits BOM[BCMCS: T_FLOW; RFDB=0], BOM[BCMCS: T_FLOW; RFDB=0], BOM[BCMCS: T_FLOW; RFDB=1], BOM[BCMCS: T_FLOW; RFDB=1], respectively, in 1208, 1212, 1216 and 1220, respectively, of FIG. 12. In 1224 of FIG. 12, the AT C leaves the target sector T2 and enters the target sector T3, as shown in FIG. 13. Accordingly, as shown in FIG. 13, after AT C leaves target sector T2, no multicast group members remain therein. In 1228 of FIG. 12, the AT C waits a short period of time (e.g., equal to a BOM period) to determine whether a BCMCS flow registration message needs to be transmitted for the new sector (e.g., no BCMCS flow registration message need be transmitted if the new sector is already a target sector).

Next, in each of sectors T2, T3, N3 and N4, the RAN 120 transmits BOM[BCMCS: T_FLOW; RFDB=0], BOM[BCMCS: T_FLOW; RFDB=0], BOM[BCMCS: T_FLOW; RFDB=1], BOM[BCMCS: T_FLOW; RFDB=1], respectively, in 1232, 1236, 1240 and 1244, respectively, of FIG. 12. Accordingly, the AT C need not send a BCMCS flow registration message for BCMCS flow T_FLOW because the BOM sent by target sector T3 has indicated that the BCMCS flow T_FLOW is already present on the BCH.

Next, in 1248 and 1252 of FIG. 12, assume that the first timer TIMER1 has expired at each of target sectors T2 and T3.

Accordingly, in each of sectors T2 and T3, the RAN 120 transmits BOM[BCMCS: T_FLOW; RFDB=1] (e.g., see 735 of FIG. 7). Also, in 1256 and 1260, the RAN 120 transmits BOM[BCMCS: T_FLOW; RFDB=0] (e.g., because N3 and N4 are supporting sectors, see 800 of FIG. 8).

Figure 14:
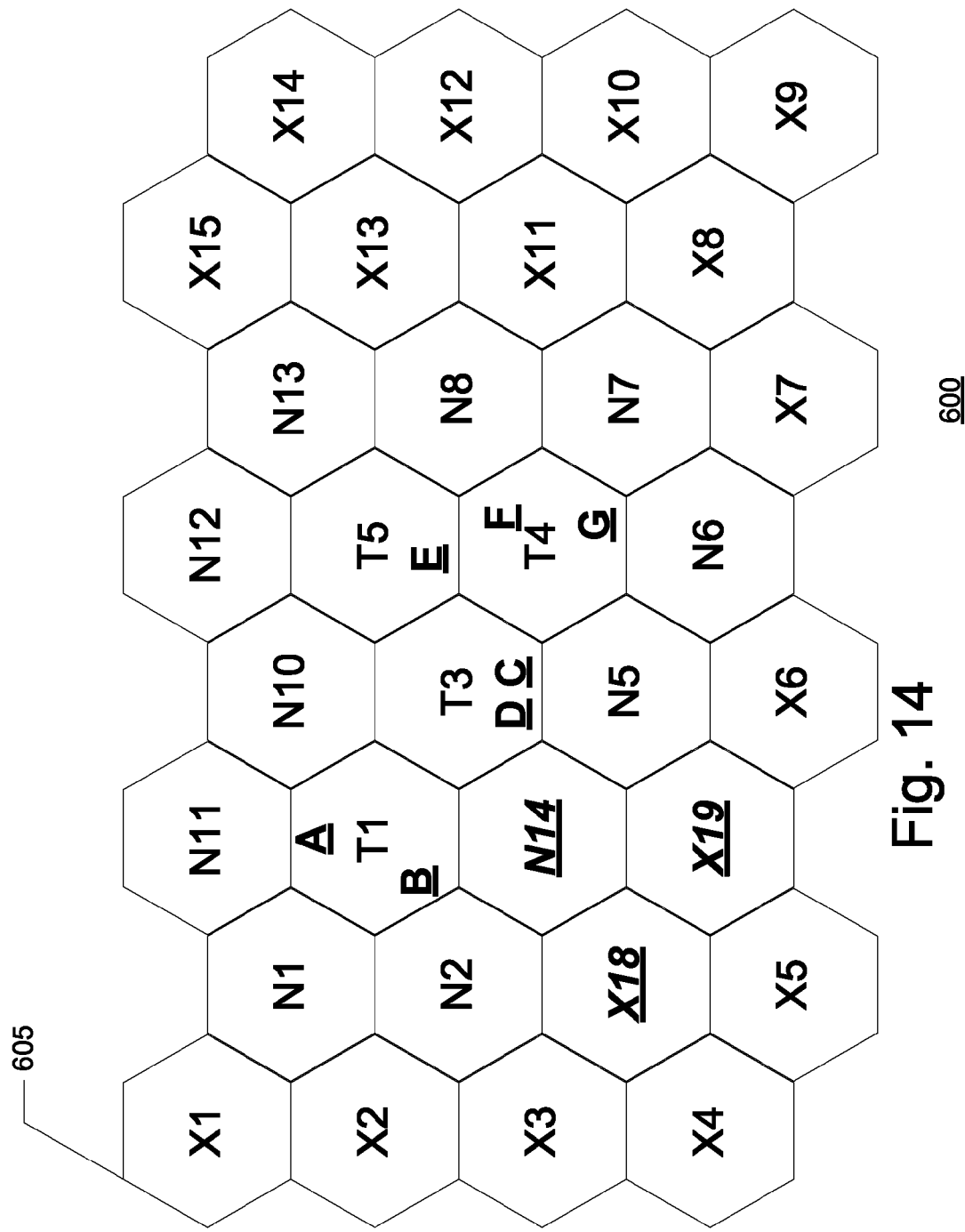

Because the target sector T3 transmitted a BOM[BCMCS: T_FLOW; RFDB=1], the AT C transmits a BCMCS flow registration message requesting access to the BCMCS flow T_FLOW in 1264 of FIG. 12. Accordingly, the target sector T2 transitions to a supporting sector N14 in 1268 (e.g., see 745 of FIG. 7) and the target sector T3 maintains its status as a target sector in 1272 (e.g., see 740 of FIG. 7). Also, as shown in FIG. 14, the supporting sector N3 transitions to non-supporting sector X18 in 1276 because old supporting sector N3 is no longer adjacent to a target sector (e.g., see 815 of FIG. 8), and likewise the supporting sector N4 transitions to non-supporting sector X19 in 1280 because old supporting sector N4 is no longer adjacent, or in a given proximity, to a target sector (e.g., see 815 of FIG. 8).

Next, consistent with target and supporting sector functionality as described above in FIGS. 7 and 8, in 1284 the new supporting sector N14 transmits BOM[BCMCS: T_FLOW; RFDB=1] and the target sector T3 transmits BOM[BCMCS: T_FLOW; RFDB=0].

While the above-described embodiments of the present invention have generally been directed to controlling AT registration transmissions for multicast groups based on a field setting (e.g., an RFDB field, an RFP field, etc.) within the BOM, it will be appreciated that other embodiments of the present invention need not be limited to a BOM-type implementation. For example, a field of any downlink control or scheduling signal may be used to either suppress or prompt feedback from one or more ATs, such that BOMs need not be used to achieve such functionality.

As discussed above with respect to FIGS. 4 through 14, a cluster includes target sectors and supporting sectors, each of which supports or carries the multicast or PTT session. In the examples provided with respect to FIGS. 4 through 14 above, the supporting sectors of the cluster correspond either to (i) non-target sectors that are adjacent to one or more target sectors or (ii) non-target sectors satisfying a given proximity metric (e.g., non-target sectors within a given distance of one or more target sectors, etc.) with respect to one or more target sectors and/or (iii) non-target sectors satisfying a given signal strength metric (e.g., non-target sectors providing enough signal strength to multicast group members within one or more target sectors, etc.) with respect to one or more target sectors. As will be appreciated, the adjacency of a non-target sector (i) and the given signal strength metric (iii) can each be examples of the given proximity metric (ii) because an adjacent sector orientation and a signal strength level can each be based upon proximity. For example, the given signal strength metric of (iii) can be based on the level of BTS signal strength as received and measured at one or more multicast group members, or other ATs, within one or more target sectors. In other words, if ATs within a target sector detect another sector providing a good signal, that sector can be added as a supporting sector. However, there are many different ways in which the cluster can be formed and maintained. In particular, the manner in which supporting sectors are generated or determined in 415 of FIG. 4 can be performed in many alternative ways, as will now be described with respect to several illustrative examples in FIGS. 15 through 21.

Figure 15:
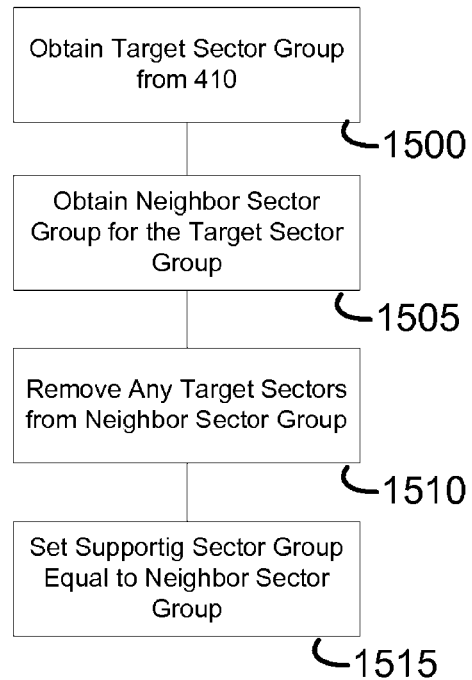
FIG. 15 illustrates the supporting sector initialization process of 415 of FIG. 4 according to another embodiment of the present invention.

FIG. 15 illustrates the supporting sector initialization process of 415 of FIG. 4 according to another embodiment of the present invention. In 1500, the RAN 120 obtains the initial target sector group for the cluster, as determined in 410 of FIG. 4. After obtaining the target sector group in 1500, the RAN 120 determines, in 1505, the neighbor sectors for each target sector within the target sector group. As used herein, a neighbor sector is a predetermined sector that is related to one or more other sectors. In an example, neighbor sectors can be determined via field testing or drive testing. The neighbor sectors of any particular sector can be included within the SectorParameters message for that sector. SectorParameters messages are overhead messages broadcast by the RAN 120, and are defined by 1x EV-DO standards. The list of neighbor sectors of a given sector is determined such that an AT receiving poor signal strength from the base station can receive acceptable signal strength from one or more of the "neighbor" sectors. Each AT is configured to periodically measure the signal strength of the neighbor sectors and request handoff to a neighbor sector if the signal strength of the neighbor sector exceeds a certain level. Therefore, the neighbor sectors of a given sector are good candidates for providing a significant combining or soft-combining gain in the forward link reception if each neighbor sector is configured as a supporting sector that transmits the same signal as the given target sector. Collectively, the neighbor sectors for each of the target sectors of the target sector group correspond to a "neighbor sector group".

In 1510, the RAN 120 removes, from the neighbor sector group, any neighbor sectors that overlap with target sectors in the target sector group. Then, in 1515, the RAN 120 sets the supporting sector group equal to the resultant neighbor sector group (i.e., post-target sector removal). Thus, because each target sector will be supporting the PTT session, target sectors do not require a duplicative classification as support groups.

Figure 16:
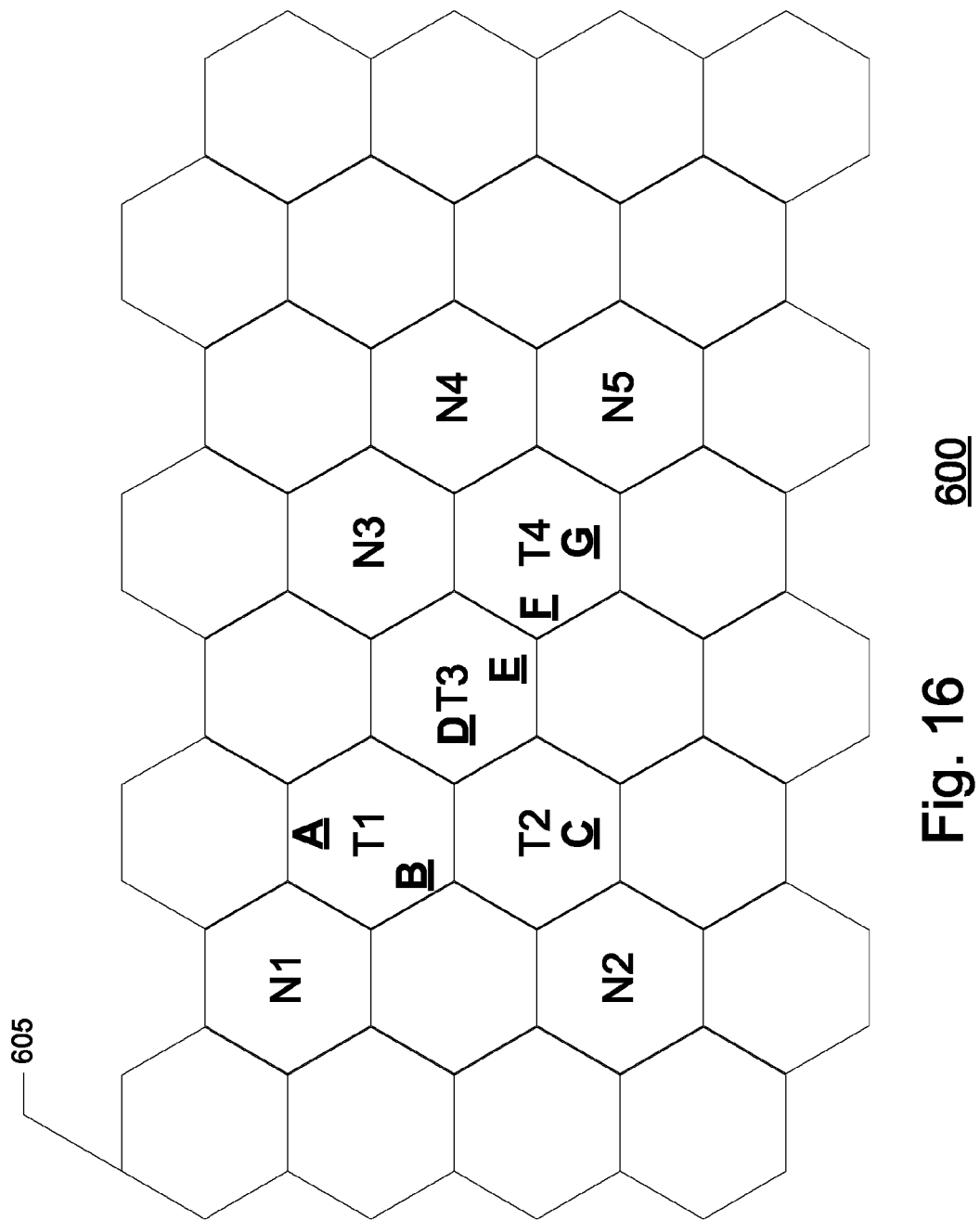
FIG. 16 illustrates an example of the resultant wireless communication system after the process of FIG. 15.

Accordingly, an example application of the process of FIG. 15 will now be provided. As described above with respect to FIG. 6, assume that ATs A through G are present or expected to be present within target sectors T1 through T4, which collectively comprise the initial target sector group. Next, assume that target sector T1 has neighbor sectors T2 and N1, target sector T2 has neighbor sectors T1 and N2, target sector T3 has neighbor sector N3 and target sector T4 has neighbor sectors T2, N4 and N5. With these assumptions, the target sector group (T1, T2, T3, T4) is obtained in 1500, the neighbor sector group (T2, N1, T1, N2, N3, N4, N5) is obtained in 1505, the neighbor sector group is purged of target sectors in 1510 (N1, N2, N3, N4, N5) and the supporting sector group is set equal to the purged neighbor sector group in 1515. FIG. 16 illustrates an example of the resultant wireless communication system (with non-supporting sectors being unlabeled) after the process of FIG. 15.

Figure 17:
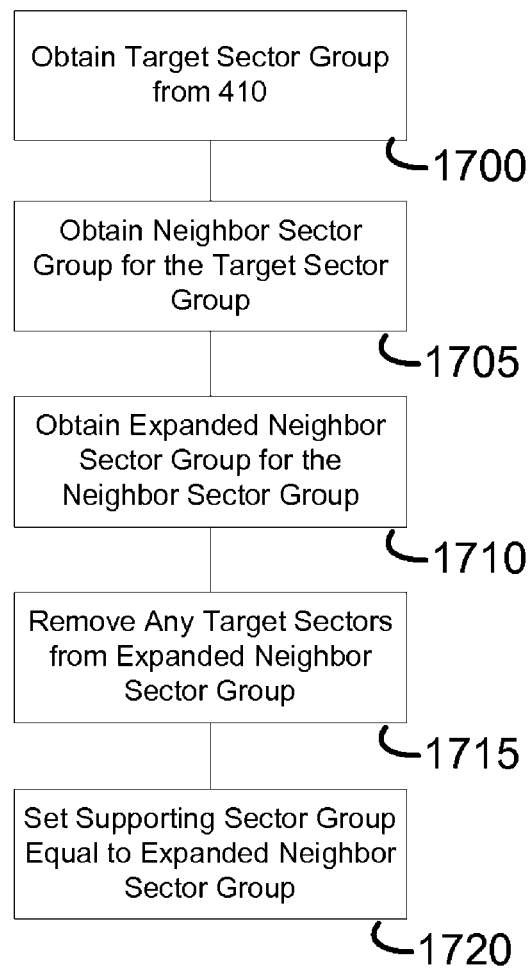
FIG. 17 illustrates the supporting sector initialization process of 415 of FIG. 4 according to another embodiment of the present invention.

FIG. 17 illustrates the supporting sector initialization process of 415 of FIG. 4 according to another embodiment of the present invention. In 1700, the RAN 120 obtains the initial target sector group for the cluster, as determined in 410 of FIG. 4. After obtaining the target sector group in 1700, the RAN 120 determines, in 1705, the neighbor sectors for each target sector within the target sector group. Collectively, the neighbor sectors for each of the target sectors of the target sector group correspond to a "neighbor sector group".

After obtaining the neighbor sector group in 1705, the RAN 120 determines, in 1710, the neighbor sectors for each of the neighbor sectors in the neighbor sector group. Collectively, (i) the neighbor sectors for each of the target sectors of the target sector group (ii) plus the neighbor sectors for each of the neighbor sectors of the neighbor sectors group correspond to an "expanded neighbor sector group". In an example, to reduce repetitive processing at the RAN 120, the neighbor sectors for each individual sector ("individual neighbor sector groups"), and "expanded" or second-tier individual neighbor sector groups can each be calculated or determined, for each sector, before the process of FIG. 17 is executed. Thus, steps 1705 and 1710 of FIG. 17 can actually be performed prior to the execution of FIG. 17, such that 1705 and 1710 are configured to access registers at the RAN 120 that store the results of the earlier execution.

In 1715, the RAN 120 removes, from the expanded neighbor sector group, any neighbor sectors that overlap with target sectors in the target sector group. Then, in 1720, the RAN 120 sets the supporting sector group equal to the resultant expanded neighbor sector group (i.e., post-target sector removal).

Figure 18A:
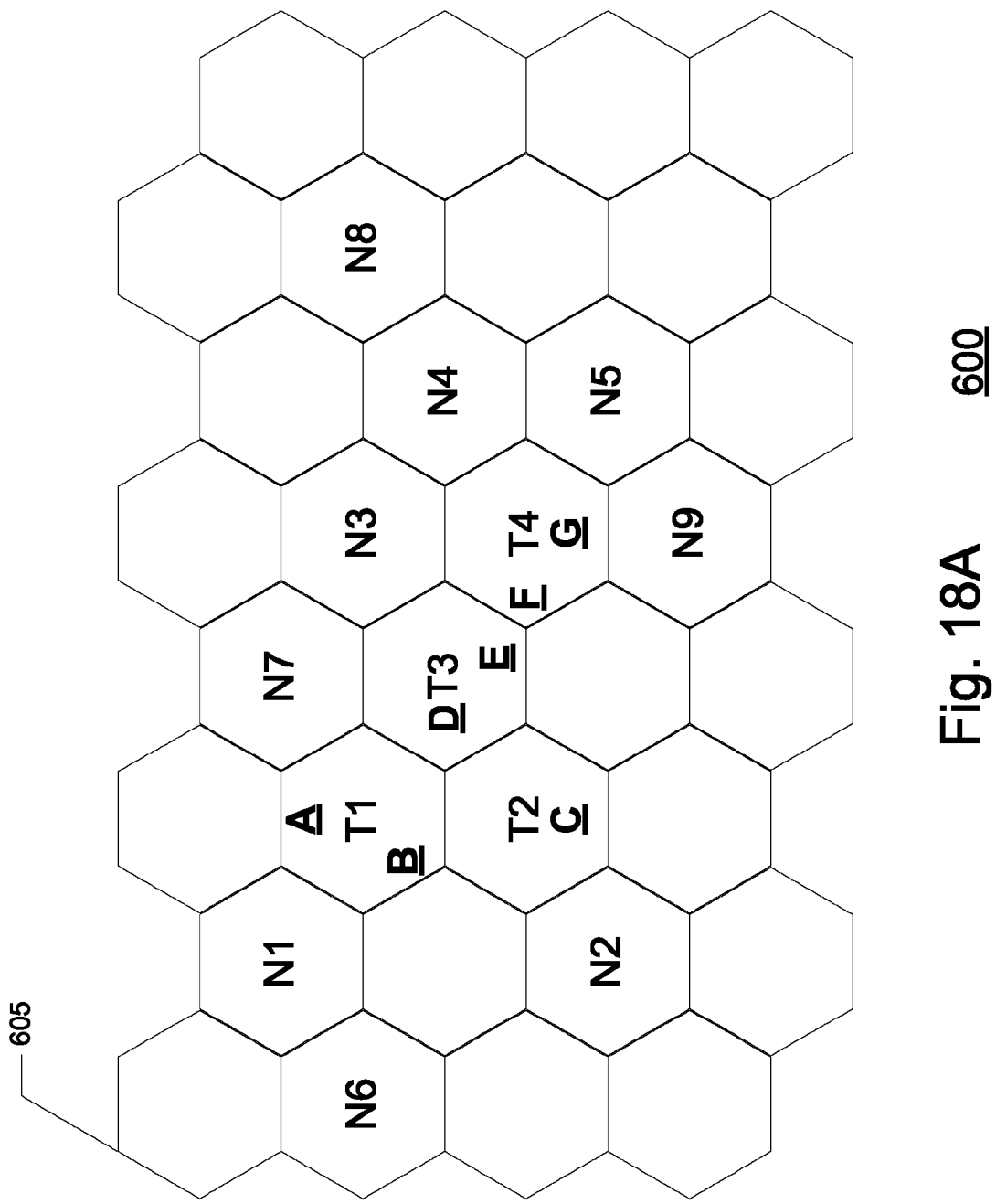
FIGS. 18A and 18B illustrates an example of the resultant wireless communication system after the process of FIG. 17.

Accordingly, an example application of the process of FIG. 15 will now be provided. As described above with respect to FIG. 6, assume that ATs A through G are present or expected to be present within target sectors T1 through T4, which collectively comprise the initial target sector group. Next, assume that target sector T1 has neighbor sectors T2 and N1, target sector T2 has neighbor sectors T1 and N2, target sector T3 has neighbor sector N3 and target sector T4 has neighbor sectors T2, N4 and N5. Further, assume that neighbor sector N1 has neighbor sector N6, neighbor sector N2 has neighbor sector T2, neighbor sector N3 has neighbor sectors T3 and N7, neighbor sector N4 has neighbor sector N8 and neighbor sector N5 has neighbor sector N9. With these assumptions, the target sector group (T1, T2, T3, T4) is obtained in 1700, the neighbor sector group (T2, N1, T1, N2, N3, N4, N5) is obtained in 1705, the expanded neighbor sector group (T2, N1, T1, N2, N3, N4, N5, N6, T3, N7, N8, N9) is obtained in 1710, the expanded neighbor sector group is purged of target sectors in 1510 (N1, N2, N3, N4, N5, N6, N7, N8, N9) in 1715, and the supporting sector group is set equal to the purged expanded neighbor sector group in 1720. FIG. 18A illustrates an example of the resultant wireless communication system (with non-supporting sectors being unlabeled) after the process of FIG. 17.

Figure 18B:
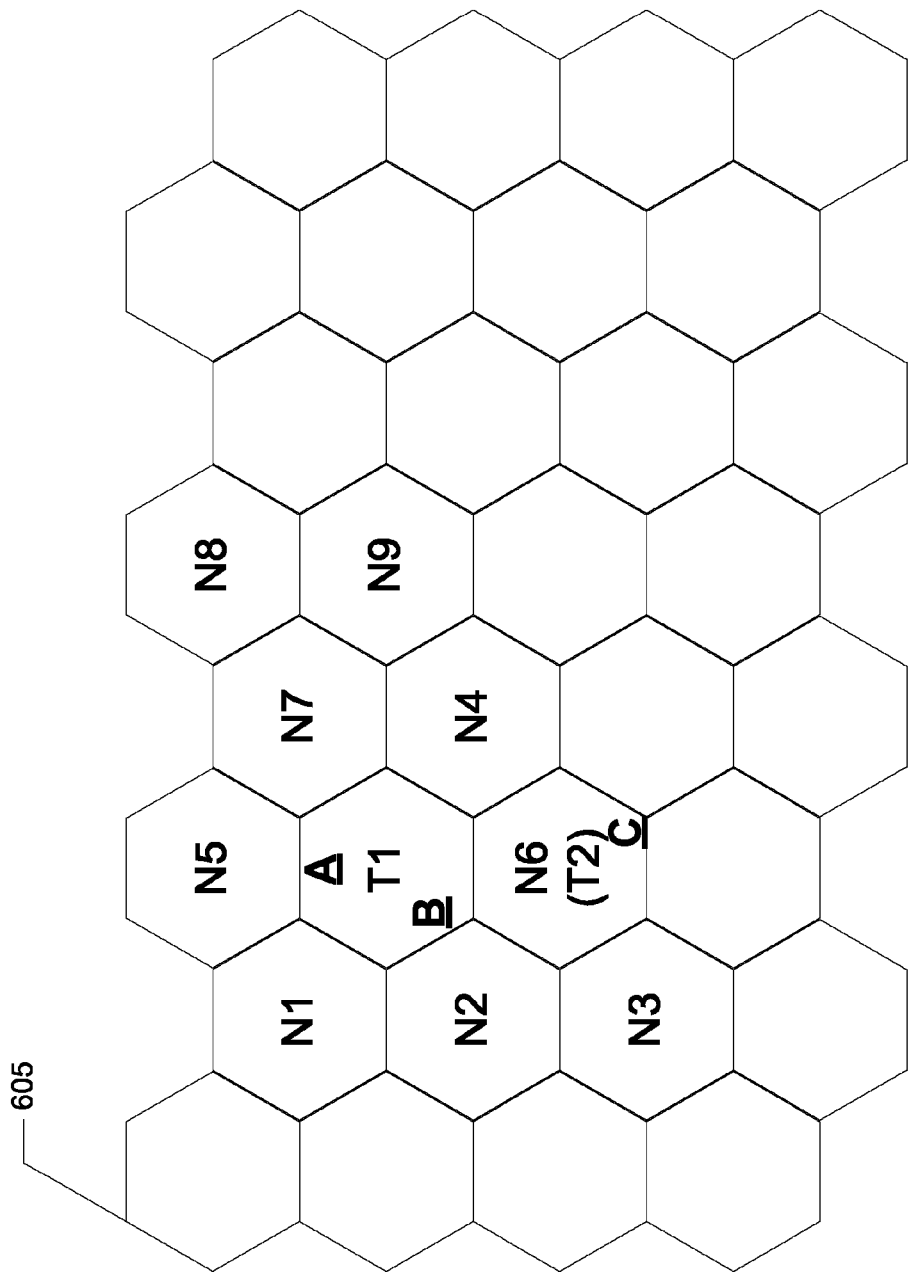

Further, it will be appreciated that the actual number of neighbor sectors allocated to any given sector can be greater than those provided in the examples described in this application. The number of neighbor sectors provided in examples within this application have been reduced to more conveniently explain concepts of the present invention, and are not necessarily intended to be indicative of real-world implementations of those concepts. Although only a limited number of neighbor sectors have been illustrated in FIG. 18A for clarity of explanation, conventionally, all or almost all adjacent sectors and even sectors next to the adjacent sectors form the list of neighbor sectors for a given AT (e.g., T1) as illustrated in FIG. 18B. As shown in FIG. 18B, target sector T1 includes nine (9) total neighbor sectors N1 through N9. In other examples, the number of neighbor sectors for a given sector could easily exceed twenty. It will be appreciated that embodiments of the present invention can be directed to sectors having any number of neighbor sectors.

Figure 19:
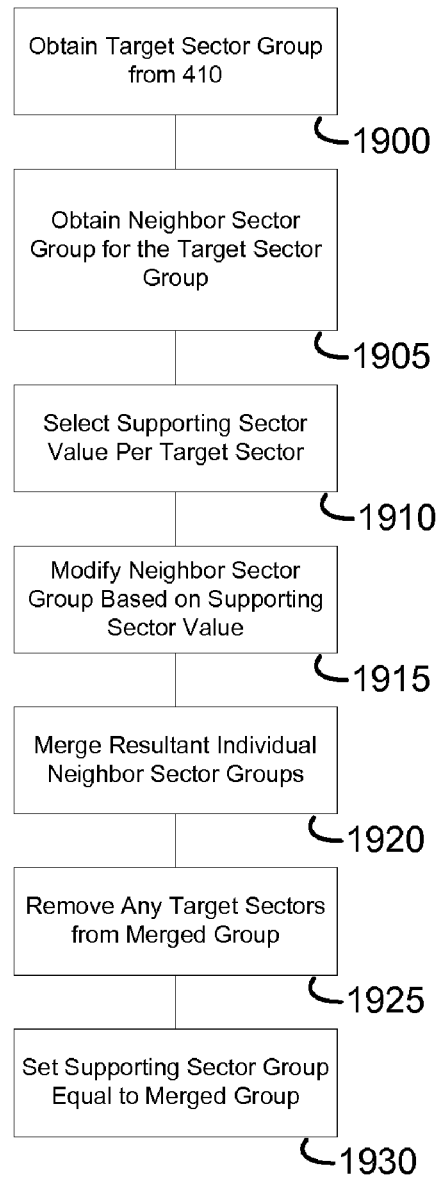
FIG. 19 illustrates the supporting sector initialization process of 415 of FIG. 4 according to another embodiment of the present invention.

FIG. 19 illustrates the supporting sector initialization process of 415 of FIG. 4 according to another embodiment of the present invention. In 1900, the RAN 120 obtains the initial target sector group for the cluster, as determined in 410 of FIG. 4. After obtaining the target sector group in 1900, the RAN 120 determines, in 1905, the neighbor sectors for each target sector within the target sector group. Collectively, the neighbor sectors for each of the target sectors of the target sector group correspond to a "neighbor sector group".

After obtaining the neighbor sector group in 1905, the RAN 120 determines, in 1910, a supporting sector value. The supporting sector value is a positive integer that corresponds to the number of desired supporting sectors, from the perspective of each target sector within the target sector group, as will be described in greater detail below. The supporting sectors value can either be a "global" supporting sectors value, such that a single supporting sectors value is selected for each sector, or alternatively can be a sector-specific supporting sector value that is specially selected or configured for each sector. In an example, the supporting sector value(s) is selected by a system designer, and can be established for all PTT sessions, or can be specially configured for particular PTT call groups. In 1915, the RAN 120 modifies the neighbor sector group based on the supporting sector value, as will now be explained in greater detail with respect to FIG. 20.

Figure 20:
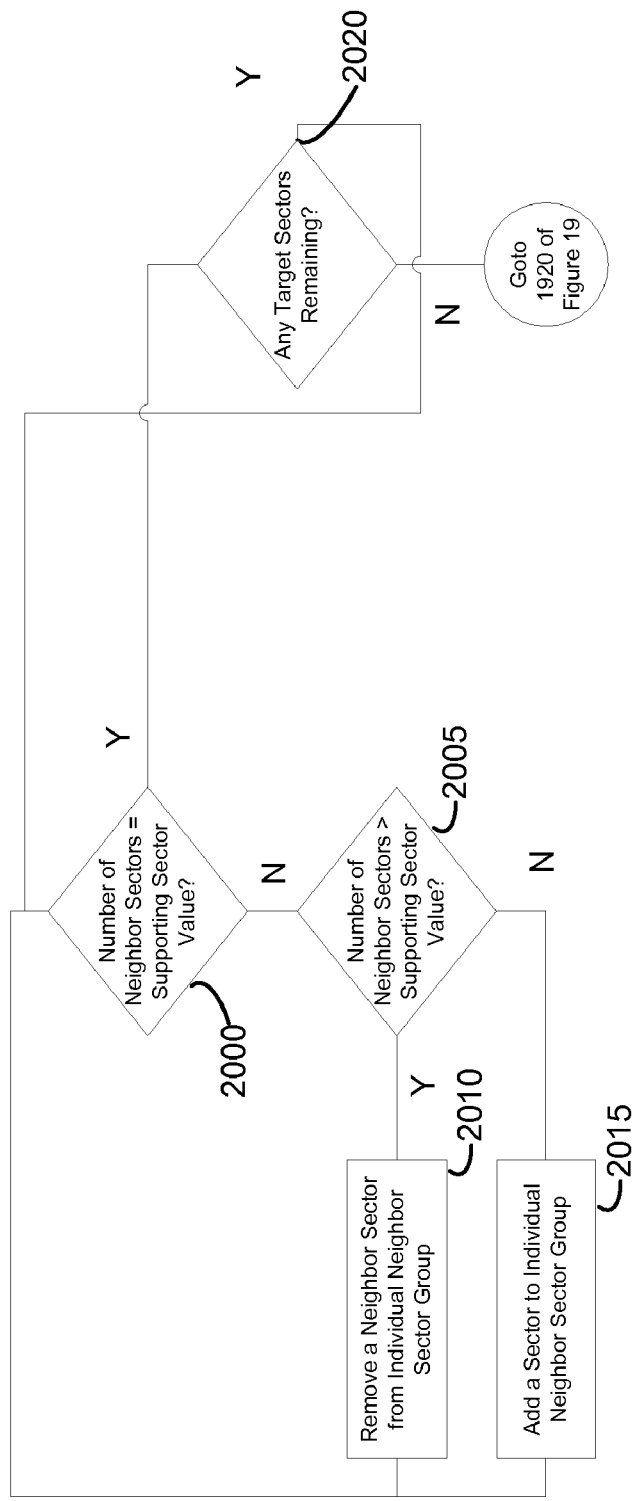
FIG. 20 illustrates the neighbor sector group modification process of 1915 of FIG. 19 in greater detail according to an embodiment of the present invention.

FIG. 20 illustrates the neighbor sector group modification process of 1915 in greater detail according to an embodiment of the present invention. The process of FIG. 20 is executed for each target sector within the target sector group, and is described below as executed at a representative target sector. For the sake of clarity, the "neighbor sector group" corresponds to neighbor sectors of each target sector within the target sector group, and an "individual neighbor sector group" corresponds to neighbor sectors for a particular target sector.

In 2000, the RAN 120 determines whether the number of neighbor sectors within an individual neighbor sector group for a given target sector equals the supporting sector value. If the number of neighbor sectors within the individual neighbor sector group is determined to be equal to the supporting sector value, then the process advances to 2020.

Otherwise, if the number of neighbor sectors within the individual neighbor sector group is determined not to be equal to the supporting sector value, in 2005, the RAN 120 determines whether the number of neighbor sectors in the individual neighbor sector group is greater than the supporting sector value. If the RAN 120 determines that the number of neighbor sectors in the individual neighbor sector group is greater than the supporting sector value in 2005, then one of the neighbor sectors is removed from the individual neighbor sector group in 2010. For example, the RAN 120 knows the geographic locations of each sector within the wireless communication system 100, wherein the geographic location of a sector corresponds to a geographic location of a base station supporting that sector. For example, the RAN 120 maintains a table of GPS locations for each base station within the wireless communication system 100. Accordingly, in 2010, the removed neighbor sector can be, for example, the most distant sector within the individual neighbor sector group from the position of the base station within the given target sector (e.g., as determined by a simple calculation based on the positions of the neighbor sectors and the position of the given target sector).

Otherwise, if the RAN 120 determines that the number of neighbor sectors in the individual neighbor sector group is not greater than (i.e., less than) the supporting sector value in 2005, then a sector is added to the individual neighbor sector group in 2015. For example, in 2010, the added sector can be the closest sector to the given target sector (e.g., determined based on base station location as discussed above) that is not within the individual neighbor sector group. Thus, as will be appreciated, the individual neighbor sector group can be expanded to include sectors that are not necessarily "neighbor" sectors as defined above.

After a sector is added to the individual neighbor sector group in 2015 or removed in 2010, the RAN 120 reevaluates the number of sectors within the neighbor sector group in 2000. If the supporting sector value still does not equal the number of sectors within the individual neighbor sector group, the process advances again to 2005. Otherwise, the process advances to 2020, where the RAN 120 determines whether any remaining target sectors within the target sector group are present that have not yet had their individual neighbor sector groups modified to comply with the supporting sector value. If one or more target sectors remain, the process returns to 2000 for the next target sector. Otherwise, the process advances to 1920 of FIG. 9.

Returning to FIG. 19, it will be appreciated that each of steps 1905, 1910 and 1915 (i.e., the process of FIG. 20) can be performed in advance, such that the RAN 120 maintains the individual neighbor sector groups and/or the "modified" individual neighbor sector groups (e.g., subsequent to the process of FIG. 20) locally at one or more registers. Thus, steps 1905 through 1915 need not actually be performed each time a supporting sector group is populated. Rather, the RAN 120 can simply access the registers corresponding to the modified individual neighbor sector groups for each target sector obtained or determined in 1900. Thus, in either case, after obtaining the individual modified neighbor sector groups for each target sector, the process advances to 1920.

In 1920, the RAN 120 merges the individual neighbor sector groups for each of the target sectors within the target sector group into a merged group. In 1925, the RAN 120 removes, from the merged group, any sectors that overlap with target sectors in the target sector group. Then, in 1930, the RAN 120 sets the supporting sector group equal to the resultant merged group (i.e., post-target sector removal).

Accordingly, an example application of the process of FIGS. 19 and 20 will now be provided. As described above with respect to FIG. 6, assume that ATs A through G are present or expected to be present within target sectors T1 through T4, which collectively comprise the initial target sector group. Next, assume that target sector T1 has neighbor sectors T2 and N1, target sector T2 has neighbor sectors T1 and N2, target sector T3 has neighbor sector N3 and target sector T4 has neighbor sectors T2, N4 and N5.

With these assumptions, the target sector group (T1, T2, T3, T4) is obtained in 1900, the neighbor sector group (T2, N1, T1, N2, N3, N4, N5) is obtained in 1905 and a supporting sector value of two (2) is selected in 1910. Next, the process of FIG. 20 is executed for each of target sectors T1 through T4. Because target sectors T1 and T2 have two neighbor sectors, and the supporting sector value equals two, the individual neighbor sector groups for T1 and T2 are not modified by the process of FIG. 20. Because target sector T3 has a single neighbor sector, and the supporting sector value equals two, the RAN 120 adds the sector that is geographically closest (e.g., "N6") to target sector T3 to T3's individual neighbor sector group in 2010. Because target sector T4 has three neighbor sectors, and the supporting sector value equals two, the RAN 120 removes the sector that is geographically furthest (e.g., "N5") from target sector T4 from T4's individual neighbor sector group in 2015. Alternatively, as discussed above, if the RAN 120 performs steps 1905, 1910 and 1915 in advance, the RAN 120 merely accesses one or more registers maintained at the RAN 120 to determine the individual neighbor sector groups for each of target sectors T1 through T4.

Figure 21:
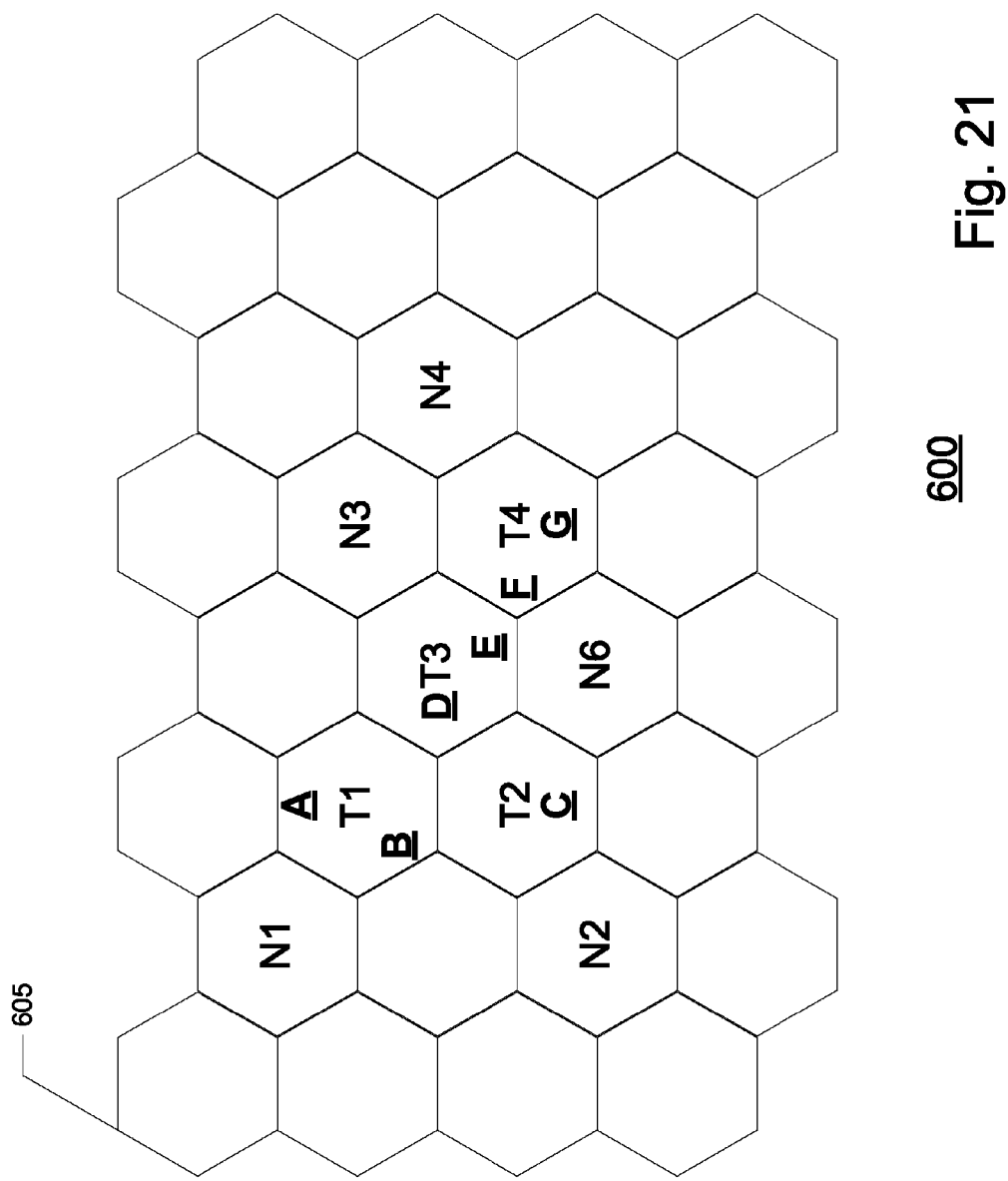
FIGS. 21-23 illustrate an example of the resultant wireless communication system after the process of FIGS. 19 and 20.

The resultant individual neighbor sector groups are merged into a merged group (T2, N1, T1, N2, N3, N4, N6) in 1920, and target sectors present within the merged group are purged from the merged group (N1, N2, N3, N4, N6) in 1925, and the supporting sector group is set equal to the purged merged group in 1930. FIG. 21 illustrates an example of the resultant wireless communication system (with non-supporting sectors being unlabeled) after the process of FIGS. 19 and 20.

As will be appreciated by one of ordinary skill in the art, the representative examples of supporting sector group formations are non-limiting and can be modified in any number of ways. For example, the process of FIG. 15 generates a supporting sector group based on a "single-tier" of neighbor sectors (i.e., neighbor sectors of target sectors), whereas the process of FIG. 17 generates a supporting sector group based on a "double-tier" of neighbor sectors (i.e., neighbor sectors of target sectors plus neighbor sectors of those neighbor sectors). It will be appreciated that any number of "tiers" can be implemented in other embodiments of the present invention. Further, the process of FIGS. 19 and 20 generates a single-tier of neighbor sectors, and then performs a modification process to achieve a given number of supporting sectors relative to each target sector. However, this process may alternative be based on a double-tier of neighbor sectors and/or any other numbered-tier of neighbor sectors. Further, the modification process can be performed in the absence of any tier. In this example, each target sector can build its individual neighbor sector group from zero, and simply add the geographically closest sectors until the number of added sectors equals the supporting sector value. In other words, there are numerous variations of the above teachings that are intended to fall within the scope of the present invention.

Further, it will be appreciated that while the processes described with respect to FIGS. 15 through 21 have been described as "initialization" processes for the supporting sector group, the processes may alternatively be used to "update" an existing supporting sector group. Thus, while the target sector behaviors and supporting sector behaviors described above are directed to examples where cluster updates are based on maintaining support groups that are adjacent to target sectors, it will be appreciated that clusters may alternatively be updated in accordance with any of the processes described with respect to FIGS. 15 through 21, and need not be limited to an adjacent-type implementation. Illustrative examples of adding/removing sectors and updating the cluster in this manner have been omitted from this application only for the sake of brevity, as it will be readily apparent to one of ordinary skill in the art how to apply the initialization procedures of the processes of FIGS. 15 through 21 in a manner so as to maintain/update a cluster (e.g., as described with respect to FIGS. 9 to 14 with regard to the adjacent and/or proximity-based supporting sector embodiment).

The above-described embodiments of the present invention have been directed to cluster formation or initialization processes, cluster "updating" processes (e.g., modifying clusters to add or remove target sectors and/or supporting sectors), and processes relating to the behavior of target sectors and supporting sectors within a particular cluster.

As will be appreciated from the above-description, a cluster corresponds to a plurality of sectors supporting a given multicast session, with the plurality of sectors including at least one target sector and at least one supporting sector. The "cluster" can be further defined as corresponding to a plurality of target and supporting sectors that are (i) contiguous and (ii) that support the given multicast session on the same interlace-multiplex (IM) pair of the downlink BCH. As used herein, the term "contiguous" means that each cluster member-sector (e.g., either a target or supporting sector) is adjacent to at least one other cluster member-sector (e.g., one or more target or supporting sectors). Further, IM pairs are included within the BOM as associated with an advertised BCMCS flow. The IM pair instructs ATs with regard to how to "tune" to the downlink BCH in order to monitor the associated, advertised BCMCS flow. The manner of using different IM pairs to carry different BCMCS flows is well-known in the art, and is discussed in more detail within Publication No. 2007/0049314 (i.e., incorporated by reference in the Background section).

Figure 22:
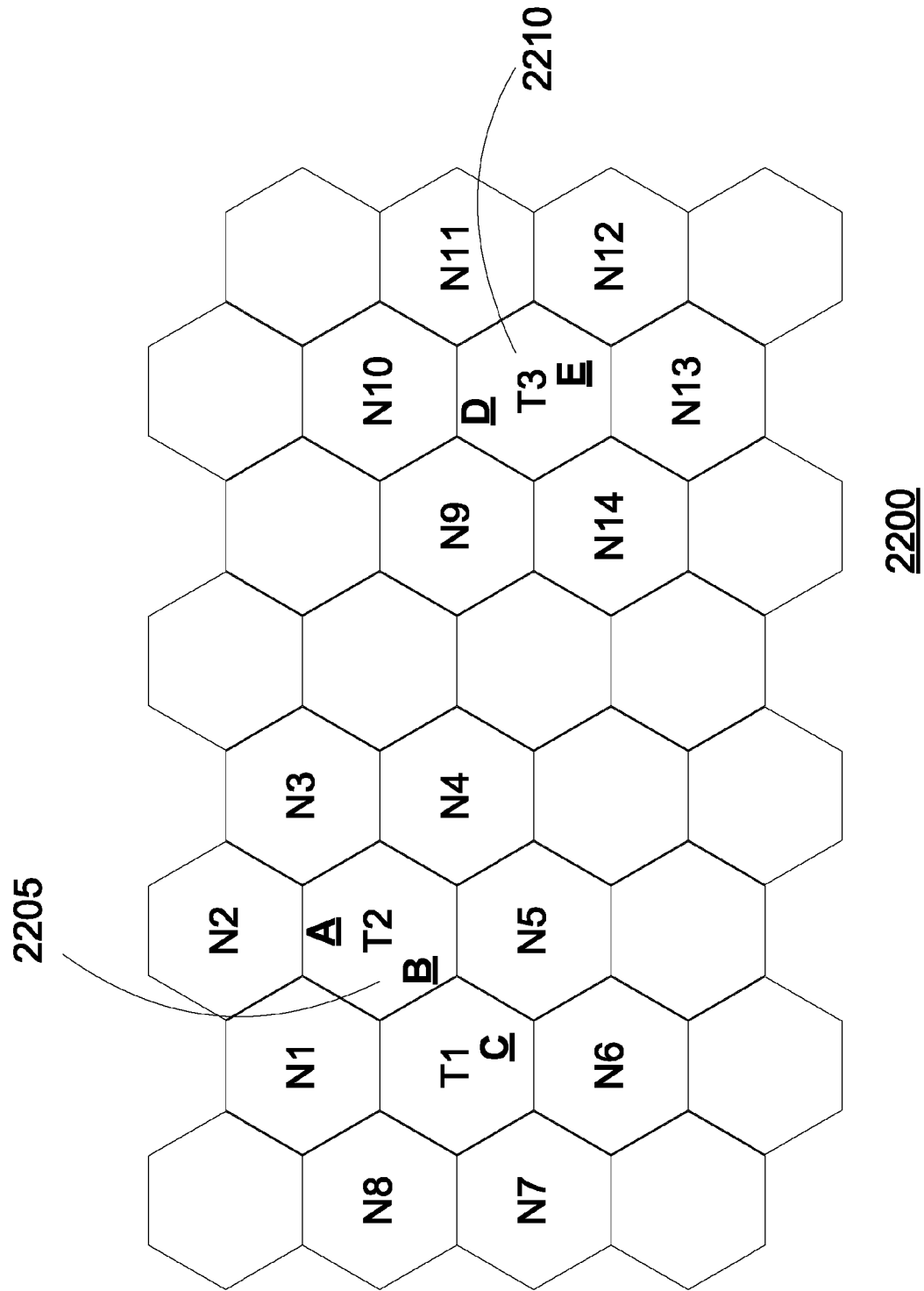

FIG. 22 illustrates a wireless communication system 2200 including two clusters according to an embodiment of the present invention. As shown in FIG. 22, the wireless communication system 2200 includes a first cluster 2205, and a second cluster 2210.

The first cluster 2205 includes target sectors T1 and T2, and supporting sectors N1 through N8. AT C is actually positioned or expected to be positioned within target sector T1, and ATs A and B are actually positioned or expected to be positioned within target sector T2. As an example, the first cluster 2205 has been configured so as to correspond to the embodiment wherein supporting sectors correspond to non-target sectors adjacent to target sectors. The second cluster 2210 includes target sector T3, and supporting sectors N9 through N14. ATs D and E are actually positioned or expected to be positioned within target sector T3. As an example, the second cluster 2210 has been configured so as to correspond to the embodiment wherein supporting sectors correspond to non-target sectors adjacent to target sectors. However, it will be appreciated that either of clusters 2205 or 2210 may be re-configured as a single-tier neighbor cluster (e.g., see FIGS. 15 and 16), a double-tier neighbor cluster (e.g., see FIGS. 17 and 18), a single-tier neighbor cluster modified by a supporting sector value (e.g., see FIGS. 19 through 21) and/or any combination thereof.

As new target sectors are added to or removed from a cluster, the cluster can "move" or grow throughout a wireless communication system. Accordingly, it will be appreciated that two or more clusters formed separately within a wireless communication system can overlap, collide, or merge, through the addition of one or more target and/or support clusters as different clusters approach each other.

In the simplest scenario, each colliding or overlapping cluster is configured to support the given multicast session on the same IM pair. In this example, the RAN 120 need not take any special action during cluster collision. In other words, the behaviors of the target sectors and supporting sectors within each cluster are the same before the cluster collision or merge as after the cluster collision or merge. Accordingly, because no special action need be taken on the part of the RAN 120 during this "simplest" scenario, the RAN 120 can, in an embodiment of the present invention, attempt to ensure that each cluster for a given multicast session within the wireless communication system supports the given multicast session on the same IM pair. Thus, in this example, during the cluster initialization process of FIG. 4, which may be performed for each cluster, an additional step may be positioned between 405 and 410. In this additional step, the RAN 120 can (i) check whether one or more other clusters exist within the wireless communication system for the given multicast session and (ii) set the IM pair for the new cluster equal to the IM pair of the one or more other clusters from (i), if possible. Thus, assuming the additional step is successful, clusters supporting the given multicast session can be maintained on the same IM pair, thereby reducing the complexity of a cluster collision.

However, it may not always be possible to configure each cluster for a given multicast session within the wireless communication system for operation on the same IM pair (e.g., because the IM pair in one or more sectors is already being used by another multicast program). Accordingly, an embodiment of the present invention is directed to handling collisions of clusters that are operating on different IM pairs, as will now be described in greater detail.

Figure 23:
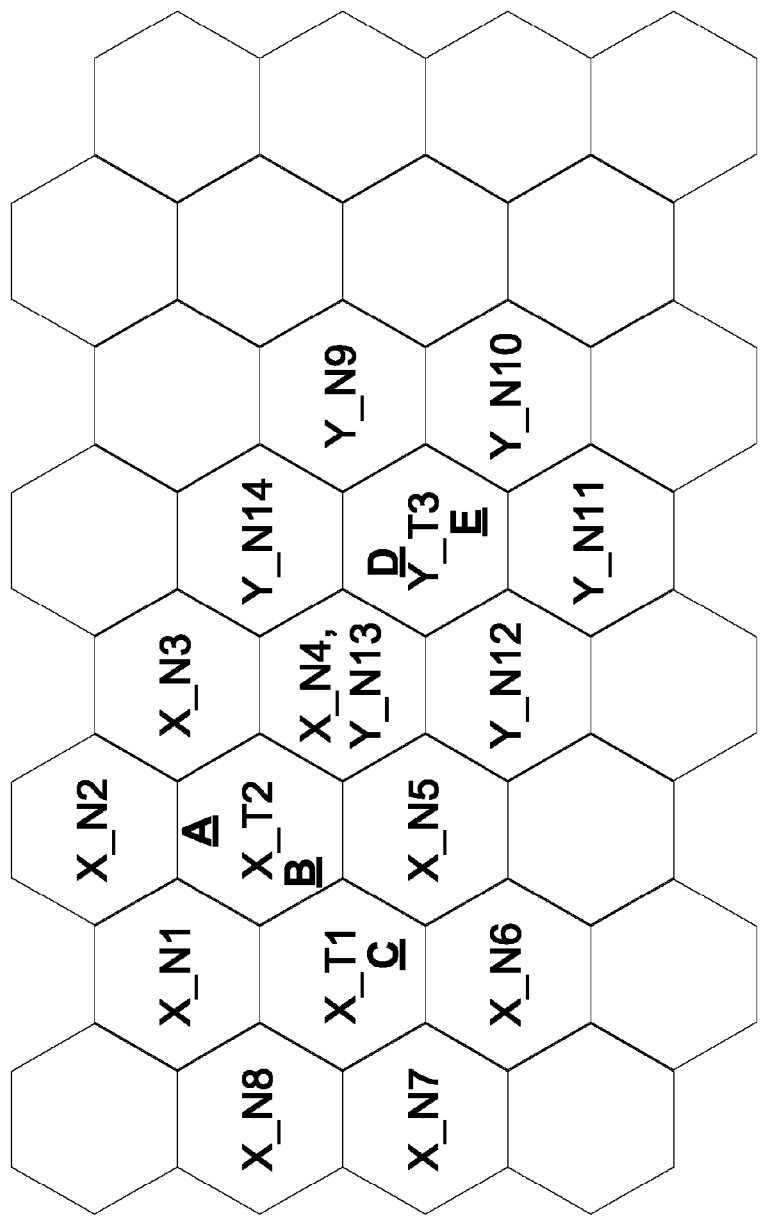

FIG. 23 illustrates a wireless communication system 2300 wherein a supporting sector of a first cluster overlaps with a supporting sector of a second cluster according to an embodiment of the present invention. For convenience of description, the first cluster is hereinafter referred to as cluster X, and the second cluster is hereinafter referred to as cluster Y. Accordingly, sectors within clusters X begin with the denotation "X_", and sectors within cluster Y begin with the denotation "Y_".

In FIG. 23, cluster X includes target sectors X_T1 and X_T2, and supporting sectors X_N1 through X_N8. AT C is actually positioned or expected to be positioned within target sector X_T1, and ATs A and B are actually positioned or expected to be positioned within target sector X_T2. As an example, and for the sake of simplicity, cluster X has been configured so as to correspond to the embodiment wherein supporting sectors correspond to non-target sectors adjacent to target sectors. Cluster Y includes target sector Y_T3, and supporting sectors Y_N9 through Y_N14. ATs D and E are actually positioned or expected to be positioned within target sector Y_T3. As an example, and for the sake of simplicity, cluster Y has been configured so as to correspond to the embodiment wherein supporting sectors correspond to non-target sectors adjacent to target sectors. However, it will be appreciated that either of clusters X or Y may be re-configured as a single-tier neighbor cluster (e.g., see FIGS. 15 and 16), a double-tier neighbor cluster (e.g., see FIGS. 17 and 18), a single-tier neighbor cluster modified by a supporting sector value (e.g., see FIGS. 19 through 21) and/or any combination thereof.

Within the wireless communication system 2300 of FIG. 23, assume that cluster X supports the given multicast session with a first IM pair ("IM_1"), and cluster Y supports the given multicast session with a second IM pair ("IM_2"). Further, as shown in FIG. 23, supporting sector X_N4 of cluster X overlaps with, or is the same sector as, supporting sector Y_N13 of cluster Y.

Figure 24:
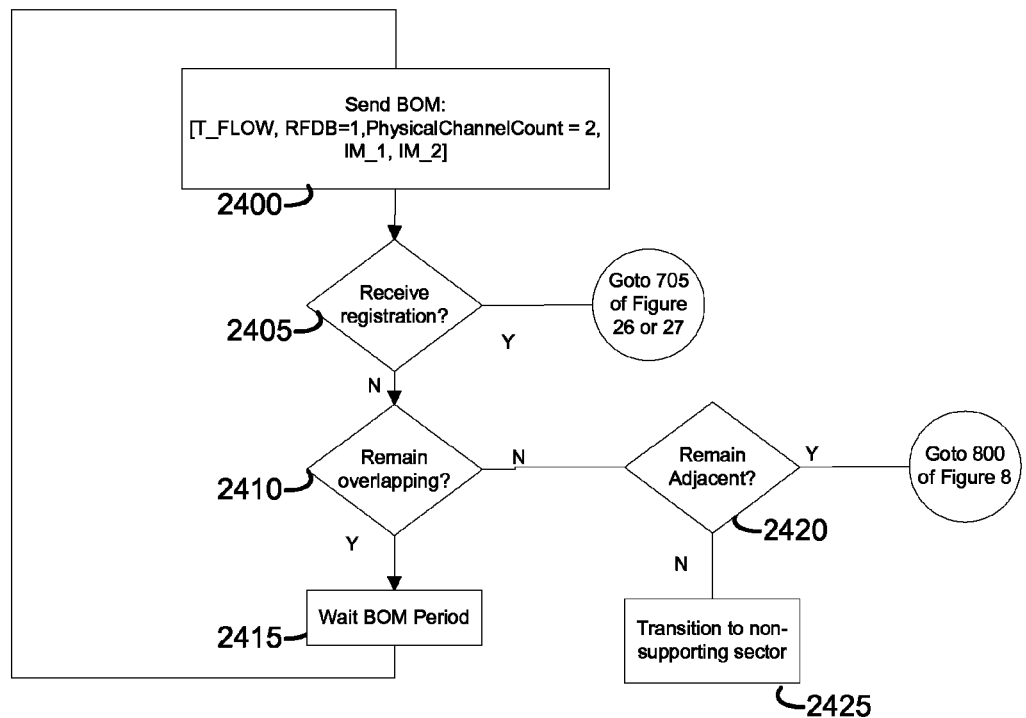
FIG. 24 is a flowchart illustrating a method according to at least one embodiment of the invention.

With the above assumptions, FIG. 24 illustrates the behavior of overlapping supporting sector X_N4/Y_N13 according to an embodiment of the present invention. The supporting sector behavior of FIG. 24 is a modification of the supporting sector behavior discussed above with respect to FIG. 8. Further, the process of FIG. 24 is directed to an embodiment wherein supporting sectors are defined as non-target sectors that are adjacent to target sectors, as in FIG. 8. However, it will be readily apparent how the process of FIG. 24 can be modified to conform with any supporting sector configuration (e.g., defining supporting sectors based on single or double-tiered neighbor sectors, based on a supporting sector value, etc.).

Referring to FIG. 24, in 2400, the RAN 120 in the supporting sector X_N4/Y_N13 transmits a BOM advertising a given BCMCS flow ("T_FLOW") and setting RFDB to 1, and further having a PhysicalChannelCount equal to 2 and including IM_1 and IM_2, denoted as BOM[BCMCS: T_FLOW; RFDB=1, PhysicalChannelCount=2, IM_1, IM_2]. The PhysicalChannelCount parameter indicates the number of IM pairs, or physical channels, upon which the given multicast session is being carried in supporting sector X_N4/Y_N13. Next, in 2405, the RAN 120 in the supporting sector X_N4/Y_N13 determines whether any BCMCS flow registration messages for T_FLOW have been received. If one or more BCMCS flow registration messages for T_FLOW are determined to have been received, the process advances to 705 of FIG. 26 or 705 of FIG. 27, discussed below in greater detail and the supporting sector X_N4/Y_N13 transitions to a target sector for either cluster X or cluster Y (e.g., based on which cluster the AT sending the BCMCSFlowRegistration message belongs to). Otherwise, the process advances to 2410.

In 2410 of FIG. 24, the RAN 120 determines whether supporting sectors X_N4 and Y_N13 remain overlapping. For example, if an adjacent target sector is dropped or removed from either cluster X or cluster Y, the supporting sector may no longer be overlapping between clusters X and Y. If the supporting sector remains in an overlapping state, the RAN 120 for the supporting sector X_N4/Y_N13 waits the given BOM period in 2415, and then returns to 2400.

Otherwise, the process advances to 2420. In 2420, the RAN 120 determines whether any adjacent target sectors are present relative to the supporting sector for either cluster X or cluster Y. If no adjacent target sectors remain, the process advances to 2425, and the supporting sector is transitioned to a non-supporting sector. After transitioning to the non-supporting sector, the non-supporting sector does not carry the BCMCS flow for T_FLOW on the BCH and does not transmit BOMs for the BCMCS flow T_FLOW. Otherwise, if the RAN 120 determines that at least one adjacent target sector for one of cluster X or cluster Y is present, the process advances to 800 of FIG. 8, and executes the supporting sector process for single-cluster (i.e., non-overlapping) supporting sectors.

Figure 25:
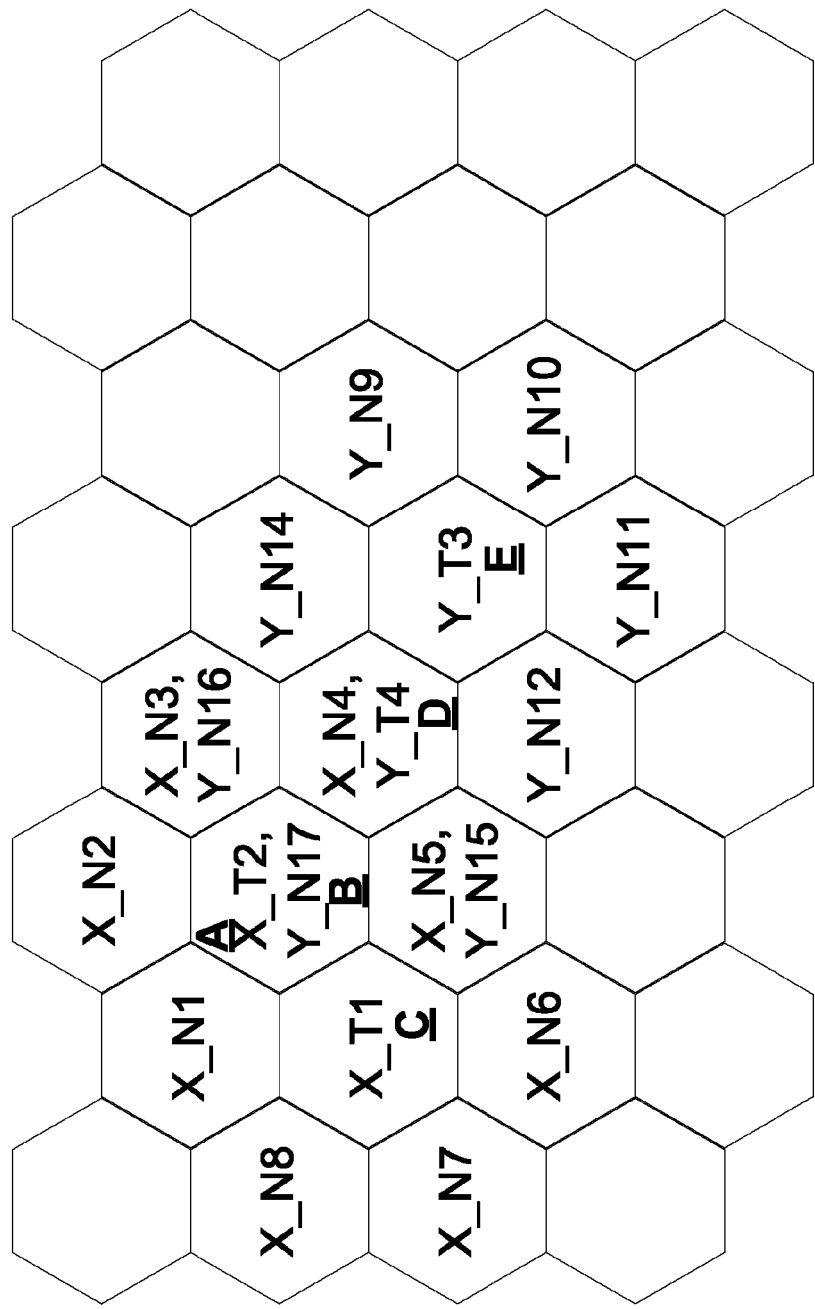
FIG. 25 illustrates the neighbor sector group modification process according to an embodiment of the present invention.

Next, within the wireless communication system 2300 of FIG. 25, assume AT D moves from target sector Y_T3 into supporting sector X_N4/Y_N13. Accordingly, assuming that the RAN 120 maintains AT D within cluster Y, supporting sector Y_N13 transitions to target sector Y_T4, which still overlaps with supporting sector X_N4 of cluster X. Likewise, supporting sectors X_N3 and X_N5 become overlapping supporting sectors X_N3/Y_N16 and X_N5/Y_N15, respectively. Also, target sector X_T2 becomes a supporting sector Y_N17 for cluster Y. The process for overlapping supporting sectors X_N3/Y_N16 and X_N5/Y_N15 is described above with respect to FIG. 24, and will not be described further for the sake of brevity. Next, two alternative embodiments relating to a process for a target sector overlapping with a supporting sector will be described with respect to FIGS. 26 and 27, respectively.

Figure 26:
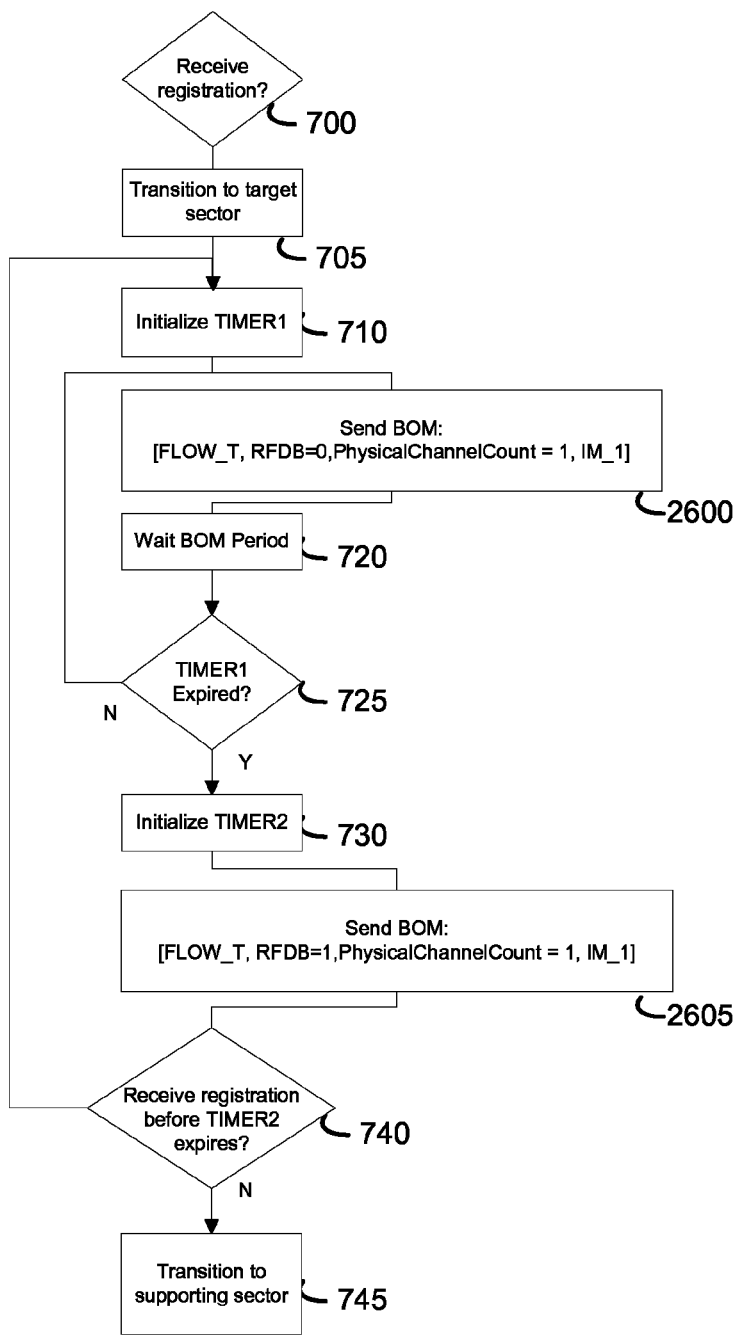
FIG. 26 is a flowchart illustrating a method according to at least one embodiment of the invention.

FIG. 26 illustrates behavior of a target sector that overlaps with a supporting sector of another cluster according to an embodiment of the present invention. The process of FIG. 26 corresponds to the process described above with respect to FIG. 7, except that step 715 is replaced with step 2600, and step 735 is replaced with step 2605. Accordingly, the steps of FIG. 26 other than 2600 and 2605 will not be further described for the sake of brevity.

In 2600, for sector X_T2/Y_N17, the RAN 120 transmits a BOM advertising the given BCMCS flow ("T_FLOW") and setting RFDB to 0, and further having a PhysicalChannelCount equal to 1 and including IM_1, denoted as BOM[BCMCS: T_FLOW; RFDB=0, PhysicalChannelCount=1, IM_1]. Accordingly, the BOM transmitted in 2600 does not advertise the BCMCS flow carried on IM_2 in sector X_T2/Y_N17, although the BCMCS flow on IM_2 is still carried within the sector. Likewise, in 2605, the RAN 120 transmits a BOM advertising the given BCMCS flow ("T_FLOW") and setting RFDB to 1, and further having a PhysicalChannelCount equal to 1 and including IM_1, denoted as BOM[BCMCS: T_FLOW; RFDB=1, PhysicalChannelCount=1, IM_1]. Accordingly, similar to 2600, the BOM transmitted in 2605 does not advertise the BCMCS flow carried on IM_2 in sector X_T2/Y_N17, although the BCMCS flow on IM_2 is still carried within the sector.

Likewise, in 2600, for sector X_N4/Y_T4, the RAN 120 transmits a BOM advertising the given BCMCS flow ("T_FLOW") and setting RFDB to 0, and further having a PhysicalChannelCount equal to 1 and including IM_2, denoted as BOM[BCMCS: T_FLOW; RFDB=0, PhysicalChannelCount=1, IM_2]. Accordingly, the BOM transmitted in 2600 does not advertise the BCMCS flow carried on IM_1 in sector X_N4/Y_T4, although the BCMCS flow on IM_1 is still carried within the sector. Likewise, in 2605, the RAN 120 transmits a BOM advertising the given BCMCS flow ("T_FLOW") and setting RFDB to 1, and further having a PhysicalChannelCount equal to 1 and including IM_2, denoted as BOM[BCMCS: T_FLOW; RFDB=1, PhysicalChannelCount=1, IM_2]. Accordingly, similar to 2600, the BOM transmitted in 2605 does not advertise the BCMCS flow carried on IM_1 in sector X_T2/Y_N17, although the BCMCS flow on IM_1 is still carried within the sector.

In this manner, it will be appreciated that the BCMCS flow is carried on IM_2 within sector X_T2/Y_N17. As such, the BCMCS flow on IM_2 is available to "support" target sector Y_T4 of cluster Y, for example, via combining or soft-combining for AT D of cluster Y within target sector Y_T4. However, the BCMCS flow in sector X_T2/Y_N17 is not advertised as being carried on IM_2 in the BOM, and as such ATs A and B do not attempt to decode the given multicast session on IM_2. Thus, ATs A and B do not "overload" themselves by attempting to decode the same packet twice (i.e., on the different respective IM pairs), which can reduce battery consumption by eliminating redundant decoding efforts and/or duplicative packet handling procedures. In the same manner, ATs A and B in sector X_T2/Y_N17 are aided by the BCMCS flow on IM_1 carried in sector X_N4/Y_T4, and AT D is not overloaded by attempting to decode signals on IM_1 in sector X_N4/Y_T4 because IM_1 for BCMCS flow T_FLOW is not advertised in the BOM in that sector.

Figure 27:
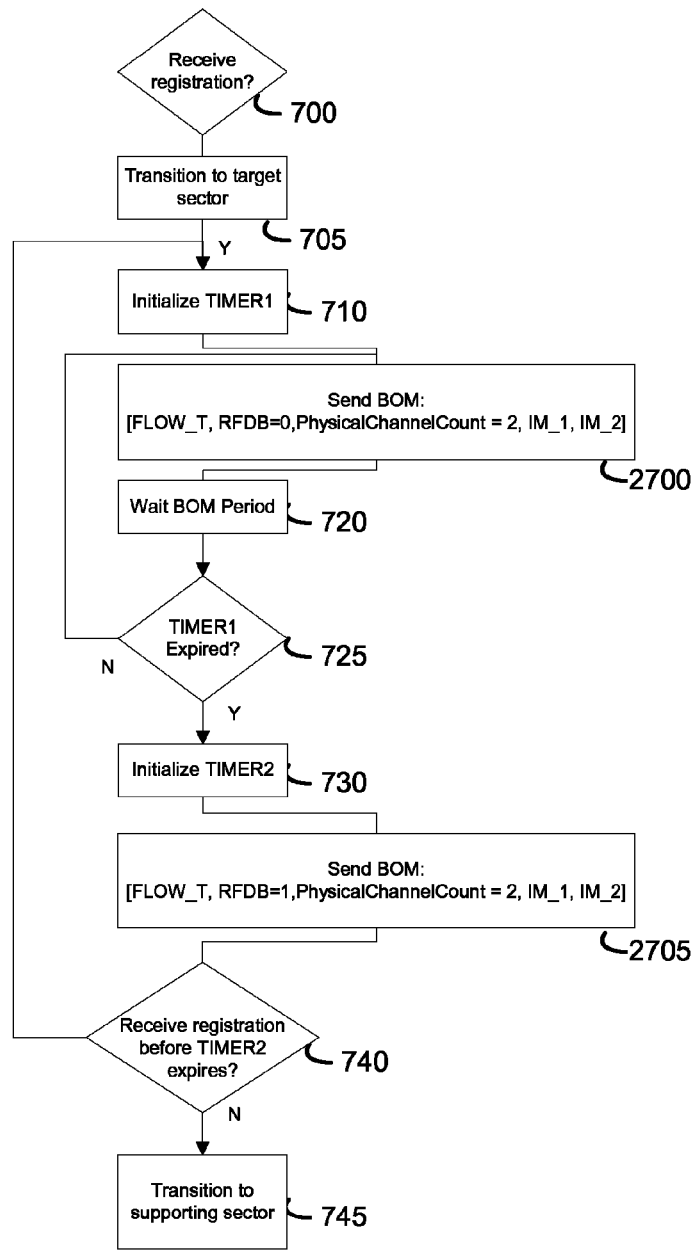
FIG. 27 is a flowchart illustrating a method according to at least one embodiment of the invention.

FIG. 27 illustrates behavior of a target sector that overlaps with a supporting sector of another cluster according to another embodiment of the present invention. The process of FIG. 27 corresponds to the process described above with respect to FIG. 7, except that step 715 is replaced with step 2700, and step 735 is replaced with step 2705. Accordingly, the steps of FIG. 27 other than 2700 and 2705 will not be further described for the sake of brevity. FIG. 27 will now be described with respect to the wireless communication system 2300 of FIG. 25.

In 2700, for sector X_T2/Y_N17, the RAN 120 transmits a BOM advertising the given BCMCS flow ("T_FLOW") and setting RFDB to 0, and further having a PhysicalChannelCount equal to 2 and including both IM_1 and IM_2, denoted as BOM[BCMCS: T_FLOW; RFDB=0, PhysicalChannelCount=2, IM_1,IM_2]. Accordingly, the BOM transmitted in 2700 advertises the BCMCS flow carried on IM_2 in sector X_T2/Y_N17, and the BCMCS flow on IM_2 (and IM_1) is still carried within the sector. Likewise, in 2705, the RAN 120 transmits a BOM advertising the given BCMCS flow ("T_FLOW") and setting RFDB to 1, and further having a PhysicalChannelCount equal to 2 and including both IM_1 and IM_2, denoted as BOM[BCMCS: T_FLOW; RFDB=1, PhysicalChannelCount=1, IM_1,IM_2]. Accordingly, similar to 2700, the BOM transmitted in 2705 advertises the BCMCS flow carried on IM_2 in sector X_T2/Y_N17, and the BCMCS flow on IM_2 (and IM_1) is still carried within the sector.

Likewise, in 2700, for sector X_N4/Y_T4, the RAN 120 transmits a BOM advertising the given BCMCS flow ("T_FLOW") and setting RFDB to 0, and further having a PhysicalChannelCount equal to 2 and including both IM_1 and IM_2, denoted as BOM[BCMCS: T_FLOW; RFDB=0, PhysicalChannelCount=2, IM_1,IM_2]. Accordingly, the BOM transmitted in 2700 advertises the BCMCS flow carried on IM_1 in sector X_N4/Y_T4, and the BCMCS flow on IM_1 (and IM_2) is still carried within the sector. Likewise, in 2705, the RAN 120 transmits a BOM advertising the given BCMCS flow ("T_FLOW") and setting RFDB to 1, and further having a PhysicalChannelCount equal to 2 and including both IM_1 and IM_2, denoted as BOM[BCMCS: T_FLOW; RFDB=1, PhysicalChannelCount=1, IM_1,IM_2]. Accordingly, similar to 2700, the BOM transmitted in 2705 advertises the BCMCS flow carried on IM_1 in sector X_N4/Y_T4, and the BCMCS flow on IM_1 (and IM_2) is still carried within the sector.

Accordingly, in contrast to the embodiment of FIG. 26, BOMs sent in target sectors that have overlapping supporting sectors can advertise multicast sessions as being supported by both (i) the IM pair associated with the cluster of the target sector and (ii) the IM pair associated with the cluster of the supporting sector. In response to a BOM with dual-IM pairs being advertised, ATs will attempt to decode the multicast session at both IM pairs. As noted above, this can result in duplicative decoding efforts and processing at the AT. However, it is also possible, at least in some circumstances, that the decode rate can be beneficially aided by the dual transmission/decoding due to, for example, a diversity effect. For example, if signal quality of one IM pair at a given AT is poor whereas signal quality of the other IM pair is good, the dual decoding at different IM pairs can result in successfully decoded packets. A determination as to whether to enable the single-IM pair implementation of FIG. 26 or the dual-IM pair implementation of FIG. 27 can be made by a system designer based on any of a number of criteria.

Further, above-described embodiments of the present invention are directed to supporting two clusters operating on different IM pairs during a cluster collision or overlap. However, in an alternative embodiment, the RAN 120 can attempt to pick one of the IM pairs of the clusters, and transfer or switch the other cluster onto the same IM pair. In this manner, the two clusters can be "merged", and the above-described processes need not be implemented. In a further example, if the different clusters are not capable of being assigned to the same IM pair that one of the clusters is already using, the RAN 120 can attempt to find an un-used or un-assigned IM pair that each cluster may use. Thus, in this scenario, each cluster can switch to the two un-conflicted cluster or IM pair. Accordingly, the RAN 120 can select between (i) whether to "merge" colliding clusters onto the same IM pair and (ii) whether to implement protocols to handle two clusters operating on different IM pairs during a collision, as discussed above with respect to FIGS. 22 to 27. Again, as discussed above, the occurrence of cluster collisions can be reduced if the RAN 120 initializes clusters to the same IM pair, although this is not always possible.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of instructing access terminals with regard to how to handle a cluster collision in a wireless communication system, comprising:
    determining whether first and second clusters within the wireless communication system overlap at least partially with each other, the first cluster including a first plurality of sectors and the second cluster including a second plurality of sectors, the first cluster carrying a given multicast session on a first interlace-multiplex (IM) pair of a downlink broadcast channel within each of the first plurality of sectors and the second cluster carrying the given multicast session on a second IM pair of the downlink broadcast channel within each of the second plurality of clusters; and
    controlling a manner in which the first and second clusters carry the given multicast session based on the determining step.

2. The method of claim 1, wherein the determining step includes determining whether a given sector qualifies as a supporting sector for the first cluster carrying the given multicast session on the first IM pair of the downlink broadcast channel and a supporting sector for the second cluster carrying the given multicast session on the second IM pair of the downlink broadcast channel, the given sector qualifying as a supporting sector in each of the first and second clusters by satisfying a given relationship to a target sector of each of the first and second clusters, each target sector within the first and second clusters expected to include at least one access terminal participating in the given multicast session.

3. The method of claim 2, wherein the controlling step includes:
    transmitting multicast messages associated with the given multicast session within the given sector on both the first and second IM pairs of the downlink broadcast channel; and
    transmitting, within the given sector, a message advertising the given multicast session and indicating that the given multicast message is carried on both of the first and second IM pairs based on the determining step.

4. The method of claim 2, wherein the given relationship is one of being a neighbor sector of the target sector, being a neighbor sector of a neighbor sector of the target sector or being geographically close to the target sector.

5. The method of claim 3, wherein the message is a broadcast overhead message (BOM).

6. The method of claim 2, wherein the controlling step includes:
    selecting a given IM pair;
    merging the first and second clusters by setting each of the first and second clusters to carry the given multicast session on the selected IM pair;
    transmitting multicast messages associated with the given multicast session within the given sector on the selected IM pair of the downlink broadcast channel; and
    transmitting, within the given sector, a message advertising the given multicast session and indicating that the given multicast message is carried on the selected IM pair based on the determining step.

7. The method of claim 6, wherein the selected IM pair is one of the first and second IM pairs.

8. The method of claim 6, wherein the selected IM pair is not one of the first and second IM pairs.

9. The method of claim 6, wherein the message is a broadcast overhead message (BOM).

10. The method of claim 1, wherein the determining step includes determining whether a given sector qualifies as a target sector for the first cluster carrying the given multicast session on the first IM pair of the downlink broadcast channel and a supporting sector for the second cluster carrying the given multicast session on the second IM pair of the downlink broadcast channel, the given sector qualifying as a supporting sector for the second cluster by satisfying a given relationship to a target sector of the second cluster, each target sector within the first and second clusters expected to include at least one access terminal participating in the given multicast session.

11. The method of claim 10, wherein the given relationship is one of being a neighbor sector of the target sector, being a neighbor sector of a neighbor sector of the target sector or being geographically close to the target sector.

12. The method of claim 10, wherein the controlling step includes:
    transmitting multicast messages associated with the given multicast session within the given sector on both the first and second IM pairs of the downlink broadcast channel; and
    transmitting, within the given sector, a message advertising the given multicast session and indicating that the given multicast message is carried on at least the first IM pair based on the determining step.

13. The method of claim 12, wherein the transmitting step transmits the message indicating that the given multicast message is carried on the first IM pair of the downlink broadcast channel and not indicating that the given multicast message is carried on the second IM pair of the downlink broadcast channel.

14. The method of claim 12, wherein the transmitting step transmits the message indicating that the given multicast message is carried on both the first and second IM pairs of the downlink broadcast channel.

15. The method of claim 12, wherein the message is a broadcast overhead message (BOM).

16. The method of claim 10, wherein the controlling step includes:
    selecting a given IM pair;
    merging the first and second clusters by setting each of the first and second clusters to carry the given multicast session on the selected IM pair;
    transmitting multicast messages associated with the given multicast session within the given sector on the selected IM pair of the downlink broadcast channel; and
    transmitting, within the given sector, a message advertising the given multicast session and indicating that the given multicast message is carried on the selected IM pair based on the determining step.

17. The method of claim 16, wherein the message is a broadcast overhead message (BOM).

18. An access network configured to manage a plurality of sectors of a wireless communications network, comprising:
   logic configured to determine whether first and second clusters within the wireless communication system overlap at least partially with each other, the first cluster including a first plurality of sectors and the second cluster including a second plurality of sectors, the first cluster carrying a given multicast session on a first interlace-multiplex (IM) pair of a downlink broadcast channel within each of the first plurality of sectors and the second cluster carrying the given multicast session on a second IM pair of the downlink broadcast channel within each of the second plurality of clusters; and
   logic configured to control a manner in which the first and second clusters carry the given multicast session based on the determination.

19. The access network of claim 18, wherein the logic configured to determine determines whether a given sector qualifies as a supporting sector for the first cluster carrying the given multicast session on the first IM pair of the downlink broadcast channel and a supporting sector for the second cluster carrying the given multicast session on the second IM pair of the downlink broadcast channel, the given sector qualifying as a supporting sector in each of the first and second clusters by satisfying a given relationship to a target sector of each of the first and second clusters, each target sector within the first and second clusters expected to include at least one access terminal participating in the given multicast session.

20. The access network of claim 19, wherein the logic configured to control includes:
   logic configured to transmit multicast messages associated with the given multicast session within the given sector on both the first and second IM pairs of the downlink broadcast channel; and
   logic configured to transmit, within the given sector, a message advertising the given multicast session and indicating that the given multicast message is carried on both of the first and second IM pairs based on the determination of the logic configured to determine.

21. The access network of claim 19, wherein the logic configured to control includes:
   logic configured to select a given IM pair;
   logic configured to merge the first and second clusters by setting each of the first and second clusters to carry the given multicast session on the selected IM pair;
   logic configured to transmit multicast messages associated with the given multicast session within the given sector on the selected IM pair of the downlink broadcast channel; and
   logic configured to transmit, within the given sector, a message advertising the given multicast session and indicating that the given multicast message is carried on the selected IM pair based on the determination of the logic configured to determine.

22. The access network of claim 18, wherein the logic configured to determine determines whether a given sector qualifies as a target sector for the first cluster carrying the given multicast session on the first IM pair of the downlink broadcast channel and a supporting sector for the second cluster carrying the given multicast session on the second IM pair of the downlink broadcast channel, the given sector qualifying as a supporting sector for the second cluster by satisfying a given relationship to a target sector of the second cluster, each target sector within the first and second clusters expected to include at least one access terminal participating in the given multicast session.

23. The access network of claim 22, wherein the logic configured to control includes:
   logic configured to transmit multicast messages associated with the given multicast session within the given sector on both the first and second IM pairs of the downlink broadcast channel; and
   logic configured to transmit, within the given sector, a message advertising the given multicast session and indicating that the given multicast message is carried on at least the first IM pair based on the determination of the logic configured to determine.

24. The access network of claim 22, wherein the logic configured to control includes:
   logic configured to select a given IM pair;
   logic configured to merge the first and second clusters by setting each of the first and second clusters to carry the given multicast session on the selected IM pair;
   logic configured to transmit multicast messages associated with the given multicast session within the given sector on the selected IM pair of the downlink broadcast channel; and
   logic configured to transmit, within the given sector, a message advertising the given multicast session and indicating that the given multicast message is carried on the selected IM pair based on the determination of the logic configured to determine.

25. An access network configured to manage a plurality of sectors of a wireless communications network, comprising:
   means for determining whether first and second clusters within the wireless communication system overlap at least partially with each other, the first cluster including a first plurality of sectors and the second cluster including a second plurality of sectors, the first cluster carrying a given multicast session on a first interlace-multiplex (IM) pair of a downlink broadcast channel within each of the first plurality of sectors and the second cluster carrying the given multicast session on a second IM pair of the downlink broadcast channel within each of the second plurality of clusters; and
   means for controlling a manner in which the first and second clusters carry the given multicast session based on the determination.

26. The access network of claim 25, wherein the means for determining determines whether a given sector qualifies as a supporting sector for the first cluster carrying the given multicast session on the first IM pair of the downlink broadcast channel and a supporting sector for the second cluster carrying the given multicast session on the second IM pair of the downlink broadcast channel, the given sector qualifying as a supporting sector in each of the first and second clusters by satisfying a given relationship to a target sector of each of the first and second clusters, each target sector within the first and second clusters expected to include at least one access terminal participating in the given multicast session.

27. The access network of claim 26, wherein the means for controlling includes:
   means for transmitting multicast messages associated with the given multicast session within the given sector on both the first and second IM pairs of the downlink broadcast channel; and
   means for transmitting, within the given sector, a message advertising the given multicast session and indicating that the given multicast message is carried on both of the first and second IM pairs based on the determination of the means for determining.

28. The access network of claim 26, wherein the means for controlling includes:

means for selecting a given IM pair;
means for merging the first and second clusters by setting each of the first and second clusters to carry the given multicast session on the selected IM pair;
means for transmitting multicast messages associated with the given multicast session within the given sector on the selected IM pair of the downlink broadcast channel; and
means for transmitting, within the given sector, a message advertising the given multicast session and indicating that the given multicast message is carried on the selected IM pair based on the determination of the means for determining.

29. The access network of claim 25, wherein the means for determining determines whether a given sector qualifies as a target sector for the first cluster carrying the given multicast session on the first IM pair of the downlink broadcast channel and a supporting sector for the second cluster carrying the given multicast session on the second IM pair of the downlink broadcast channel, the given sector qualifying as a supporting sector for the second cluster by satisfying a given relationship to a target sector of the second cluster, each target sector within the first and second clusters expected to include at least one access terminal participating in the given multicast session.

30. The access network of claim 29, wherein the means for controlling includes:
means for transmitting multicast messages associated with the given multicast session within the given sector on both the first and second IM pairs of the downlink broadcast channel; and
means for transmitting, within the given sector, a message advertising the given multicast session and indicating that the given multicast message is carried on at least the first IM pair based on the determination of the means for determining.

31. The access network of claim 29, wherein the means for controlling includes:
means for selecting a given IM pair;
means for merging the first and second clusters by setting each of the first and second clusters to carry the given multicast session on the selected IM pair;
means for transmitting multicast messages associated with the given multicast session within the given sector on the selected IM pair of the downlink broadcast channel; and
means for transmitting, within the given sector, a message advertising the given multicast session and indicating that the given multicast message is carried on the selected IM pair based on the determination of the means for determining.

32. A non-transitory computer-readable medium including program code stored thereon, the program code configured to operate within an access network configured to manage a plurality of sectors of a wireless communications network, comprising:
program code to determine whether first and second clusters within the wireless communication system overlap at least partially with each other, the first cluster including a first plurality of sectors and the second cluster including a second plurality of sectors, the first cluster carrying a given multicast session on a first interlace-multiplex (IM) pair of a downlink broadcast channel within each of the first plurality of sectors and the second cluster carrying the given multicast session on a second IM pair of the downlink broadcast channel within each of the second plurality of clusters; and
program code to control a manner in which the first and second clusters carry the given multicast session based on the determination.

33. The non-transitory computer-readable medium of claim 32, wherein the program code to determine determines whether a given sector qualifies as a supporting sector for the first cluster carrying the given multicast session on the first IM pair of the downlink broadcast channel and a supporting sector for the second cluster carrying the given multicast session on the second IM pair of the downlink broadcast channel, the given sector qualifying as a supporting sector in each of the first and second clusters by satisfying a given relationship to a target sector of each of the first and second clusters, each target sector within the first and second clusters expected to include at least one access terminal participating in the given multicast session.

34. The non-transitory computer-readable medium of claim 33, wherein the program code to control includes:
program code to transmit multicast messages associated with the given multicast session within the given sector on both the first and second IM pairs of the downlink broadcast channel; and
program code to transmit, within the given sector, a message advertising the given multicast session and indicating that the given multicast message is carried on both of the first and second IM pairs based on the determination of the logic configured to determine.

35. The non-transitory computer-readable medium of claim 33, wherein the program code to control includes:
program code to select a given IM pair;
program code to merge the first and second clusters by setting each of the first and second clusters to carry the given multicast session on the selected IM pair;
program code to transmit multicast messages associated with the given multicast session within the given sector on the selected IM pair of the downlink broadcast channel; and
program code to transmit, within the given sector, a message advertising the given multicast session and indicating that the given multicast message is carried on the selected IM pair based on the determination of the program code to determine.

36. The non-transitory computer-readable medium of claim 32, wherein the program code to determine determines whether a given sector qualifies as a target sector for the first cluster carrying the given multicast session on the first IM pair of the downlink broadcast channel and a supporting sector for the second cluster carrying the given multicast session on the second IM pair of the downlink broadcast channel, the given sector qualifying as a supporting sector for the second cluster by satisfying a given relationship to a target sector of the second cluster, each target sector within the first and second clusters expected to include at least one access terminal participating in the given multicast session.

37. The non-transitory computer-readable medium of claim 36, wherein the program code to control includes:
program code to transmit multicast messages associated with the given multicast session within the given sector on both the first and second IM pairs of the downlink broadcast channel; and
program code to transmit, within the given sector, a message advertising the given multicast session and indicating that the given multicast message is carried on at least the first IM pair based on the determination of the program code to determine.

38. The non-transitory computer-readable medium of claim 36, wherein the program code to control includes:

program code to select a given IM pair;

program code to merge the first and second clusters by setting each of the first and second clusters to carry the given multicast session on the selected IM pair;

program code to transmit multicast messages associated with the given multicast session within the given sector on the selected IM pair of the downlink broadcast channel; and program code to transmit, within the given sector, a message advertising the given multicast session and indicating that the given multicast message is carried on the selected IM pair based on the determination of the program code to determine.

39. A method of instructing access terminals with regard to how to handle a cluster collision in a wireless communication system, comprising:

determining whether first and second clusters within the wireless communication system overlap at least partially with each other, the first cluster including a first plurality of sectors and the second cluster including a second plurality of sectors, the first cluster carrying a given multicast session on a first resource unit of a downlink broadcast channel within each of the first plurality of sectors and the second cluster carrying the given multicast session on a second resource unit of the downlink broadcast channel within each of the second plurality of clusters; and controlling a manner in which the first and second clusters carry the given multicast session based on the determining step.

40. The method of claim 39, wherein the determining step includes determining whether a given sector qualifies as a supporting sector for the first cluster carrying the given multicast session on the first resource unit of the downlink broadcast channel and a supporting sector for the second cluster carrying the given multicast session on the second resource unit of the downlink broadcast channel, the given sector qualifying as a supporting sector in each of the first and second clusters by satisfying a given relationship to a target sector of each of the first and second clusters, each target sector within the first and second clusters expected to include at least one access terminal participating in the given multicast session.

41. The method of claim 39, wherein the determining step includes determining whether a given sector qualifies as a target sector for the first cluster carrying the given multicast session on the first resource unit of the downlink broadcast channel and a supporting sector for the second cluster carrying the given multicast session on a second IM pair of the downlink broadcast channel, the given sector qualifying as a supporting sector for the second cluster by satisfying a given relationship to a target sector of the second cluster, each target sector within the first and second clusters expected to include at least one access terminal participating in the given multicast session.

42. An access network configured to manage a plurality of sectors of a wireless communications network, comprising:

logic configured to determine whether first and second clusters within the wireless communication system overlap at least partially with each other, the first cluster including a first plurality of sectors and the second cluster including a second plurality of sectors, the first cluster carrying a given multicast session on a first resource unit of a downlink broadcast channel within each of the first plurality of sectors and the second cluster carrying the given multicast session on a second resource unit of the downlink broadcast channel within each of the second plurality of clusters; and logic configured to control a manner in which the first and second clusters carry the given multicast session based on the determination.

43. The access network of claim 42, wherein the logic configured to determine determines whether a given sector qualifies as a supporting sector for the first cluster carrying the given multicast session on the first resource unit of the downlink broadcast channel and a supporting sector for the second cluster carrying the given multicast session on the second resource unit of the downlink broadcast channel, the given sector qualifying as a supporting sector in each of the first and second clusters by satisfying a given relationship to a target sector of each of the first and second clusters, each target sector within the first and second clusters expected to include at least one access terminal participating in the given multicast session.

44. The access network of claim 42, wherein the logic configured to determine determines whether a given sector qualifies as a target sector for the first cluster carrying the given multicast session on the first resource unit of the downlink broadcast channel and a supporting sector for the second cluster carrying the given multicast session on a second IM pair of the downlink broadcast channel, the given sector qualifying as a supporting sector for the second cluster by satisfying a given relationship to a target sector of the second cluster, each target sector within the first and second clusters expected to include at least one access terminal participating in the given multicast session.

45. An access network configured to manage a plurality of sectors of a wireless communications network, comprising:

means for determining whether first and second clusters within the wireless communication system overlap at least partially with each other, the first cluster including a first plurality of sectors and the second cluster including a second plurality of sectors, the first cluster carrying a given multicast session on a first resource unit of a downlink broadcast channel within each of the first plurality of sectors and the second cluster carrying the given multicast session on a second resource unit of the downlink broadcast channel within each of the second plurality of clusters; and means for controlling a manner in which the first and second clusters carry the given multicast session based on the determination.

46. The access network of claim 45, wherein the means for determining determines whether a given sector qualifies as a supporting sector for the first cluster carrying the given multicast session on the first resource unit of the downlink broadcast channel and a supporting sector for the second cluster carrying the given multicast session on the second resource unit of the downlink broadcast channel, the given sector qualifying as a supporting sector in each of the first and second clusters by satisfying a given relationship to a target sector of each of the first and second clusters, each target sector within the first and second clusters expected to include at least one access terminal participating in the given multicast session.

47. The access network of claim 45, wherein the means for determining determines whether a given sector qualifies as a target sector for the first cluster carrying the given multicast session on the first resource unit of the downlink broadcast channel and a supporting sector for the second cluster carrying the given multicast session on a second IM pair of the downlink broadcast channel, the given sector qualifying as a supporting sector for the second cluster by satisfying a given relationship to a target sector of the second cluster, each target sector within the first and second clusters expected to include at least one access terminal participating in the given multicast session.

48. A non-transitory computer-readable medium including program code stored thereon, the program code configured to operate within an access network configured to manage a plurality of sectors of a wireless communications network, comprising:
   program code to determine whether first and second clusters within the wireless communication system overlap at least partially with each other, the first cluster including a first plurality of sectors and the second cluster including a second plurality of sectors, the first cluster carrying a given multicast session on a first resource unit of a downlink broadcast channel within each of the first plurality of sectors and the second cluster carrying the given multicast session on a second resource unit of the downlink broadcast channel within each of the second plurality of clusters; and
   program code to control a manner in which the first and second clusters carry the given multicast session based on the determination.

49. The non-transitory computer-readable medium of claim 48, wherein the program code to determine determines whether a given sector qualifies as a supporting sector for the first cluster carrying the given multicast session on the first resource unit of the downlink broadcast channel and a supporting sector for the second cluster carrying the given multicast session on the second resource unit of the downlink broadcast channel, the given sector qualifying as a supporting sector in each of the first and second clusters by satisfying a given relationship to a target sector of each of the first and second clusters, each target sector within the first and second clusters expected to include at least one access terminal participating in the given multicast session.

50. The non-transitory computer-readable medium of claim 48, wherein the program code to determine determines whether a given sector qualifies as a target sector for the first cluster carrying the given multicast session on the first resource unit of the downlink broadcast channel and a supporting sector for the second cluster carrying the given multicast session on a second IM pair of the downlink broadcast channel, the given sector qualifying as a supporting sector for the second cluster by satisfying a given relationship to a target sector of the second cluster, each target sector within the first and second clusters expected to include at least one access terminal participating in the given multicast session.

* * * * *